US011709413B2

(12) United States Patent
Kaya

(10) Patent No.: US 11,709,413 B2
(45) Date of Patent: Jul. 25, 2023

(54) PRINTER DEVICE AND CAMERA WITH PRINTER

(71) Applicant: FUJIFILM Corporation, Tokyo (JP)

(72) Inventor: Akimasa Kaya, Saitama (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 17/816,195

(22) Filed: Jul. 29, 2022

(65) Prior Publication Data

US 2023/0035068 A1 Feb. 2, 2023

(30) Foreign Application Priority Data

Jul. 29, 2021 (JP) ................................. 2021-124680

(51) Int. Cl.
*G03B 17/26* (2021.01)
*G03B 17/52* (2021.01)

(52) U.S. Cl.
CPC .............. *G03B 17/52* (2013.01); *G03B 17/26* (2013.01)

(58) Field of Classification Search
CPC ........ G03B 17/52; G03B 17/26; G03B 27/00; G03B 17/50
See application file for complete search history.

(56) References Cited

U.S. PATENT DOCUMENTS

2005/0281553 A1* 12/2005 Takatori ................. G03B 17/52
396/518
2019/0361336 A1 11/2019 Nakai
2023/0024154 A1* 1/2023 Kaya ..................... B65H 5/062

FOREIGN PATENT DOCUMENTS

JP 2004-246021 A 9/2004
WO 2018/008229 A1 1/2018

OTHER PUBLICATIONS

The extended European search report issued by the European Patent Office dated Jan. 2, 2023, which corresponds to European Patent Application No. 22187452.2-1020 and is related to U.S. Appl. No. 17/816,195.

* cited by examiner

Primary Examiner — Christopher E Mahoney
(74) Attorney, Agent, or Firm — Studebaker & Brackett PC

(57) ABSTRACT

A camera with a printer includes a loading room into which an instant film pack in which instant films are accommodated in a stacking manner is loaded, a slit formed in the loading room, a claw member that enters through the slit, and sends out the instant film, and a loading room side rib provided along the slit. The loading room side rib is formed at a position and with a protruding amount where the loading room side rib is capable of being inserted into the instant film pack loaded into the loading room.

10 Claims, 22 Drawing Sheets

PRINTER DEVICE AND CAMERA WITH PRINTER

CROSS-REFERENCE TO RELATED APPLICATIONS

This application claims priority under 35 U.S.C § 119(a) to Japanese Patent Application No. 2021-124680 filed on 29 Jul. 2021. The above application is hereby expressly incorporated by reference, in its entirety, into the present application.

BACKGROUND OF THE INVENTION

1. Field of the Invention

The present invention relates to a printer device and a camera with a printer.

2. Description of the Related Art

Various mobile printer devices or cameras with printer that record images on recording media such as instant films are on the market. In general, a configuration including a loading room and a discharge mechanism has been known as a printer device or a camera with a printer that uses an instant film as a recording medium (for example, JP2004-246021A). An instant film pack that accommodates a plurality of instant films in a case is loaded into the loading room. A discharge port for sending out the instant film is formed in the case of the instant film pack. The discharge mechanism has a claw member that enters an inside of the case of the instant film pack and sends out the instant film from the discharge port.

SUMMARY OF THE INVENTION

In the above-mentioned printer device or camera with a printer, in a case where the claw member sends out the instant film from the discharge port, for example, in a case where a rotation speed of a transport roller is low and a rotation load is large, a distal end side of the instant film may be caught. In a case where the distal end side of the instant film is caught, a base end of the instant film receives a compressive force by the claw member. Since the instant film has a thin sheet shape, a thickness dimension is considerably smaller than a length dimension from the distal end to the base end. Accordingly, in a case where the distal end side of the instant film is caught and the compressive force is applied to the base end side, the instant film may buckle.

An object of the present invention is to solve the above problems, and an object of the present invention is to provide a printer device and a camera with a printer capable of preventing a recording medium from buckling in a case where the recording medium is sent out.

In order to solve the above problems, a printer device according to an aspect of the present invention includes a loading room, a slit, a claw member, and a loading room side rib. The loading room side rib is formed at a position and with a protruding amount where the loading room side rib is capable of being inserted into a recording medium pack loaded into the loading room. The loading room into which the recording medium pack is loaded, the recording medium pack including at least sheet-shaped recording media and a case in which the recording media are accommodated in a stacking manner and a discharge port for sending out the recording medium is formed. The slit is formed in the loading room, and is formed by cutting out a part of a loading room inner surface facing the recording medium. The claw member enters an inside of the case through the slit, and sends out the recording medium from the discharge port. The loading room side rib is provided to protrude from the loading room inner surface along the slit.

It is preferable that the loading room side rib is disposed such that a position of a distal end facing the recording medium is a position capable of supporting the recording medium in the case in cooperation with a film pack side rib provided in the case, and it is preferable that the loading room side rib is disposed at a position where the claw member passes between the loading room side rib and the film pack side rib.

It is preferable that the case has a cut-off portion through which the claw member passes in a case where claw member sends out the recording medium, the film pack side rib is disposed along the cut-off portion, and the loading room side rib is disposed at a position where the loading room side rib enters an inside of the cut-off portion in a case where the recording medium pack is loaded into the loading room.

It is preferable that, in the loading room side rib, a surface on a distal end side facing the recording medium is a planar shape, and it is preferable that the loading room side rib has a square columnar shape disposed in parallel with the film pack side rib in a case where the recording medium pack is loaded into the loading room.

It is preferable that the recording medium is a monosheet type instant film. It is preferable that the loading room has an exposure aperture that exposes the recording medium in the case to subject light and the loading room side rib is disposed along one side of the exposure aperture.

A camera with a printer according to another aspect of the present invention includes the printer device and an imaging unit that includes an imaging optical system, and captures a subject image to output image data to the printer device.

A camera with a printer according to still another aspect of the present invention includes the printer device and an imaging optical system that exposes the instant film in the case to a subject image through the exposure aperture.

According to the present invention, it is possible to prevent the recording medium from buckling in a case where the recording medium is sent out.

DESCRIPTION OF THE PREFERRED EMBODIMENTS

First Embodiment

Overview of Camera with Printer

Figure 1:
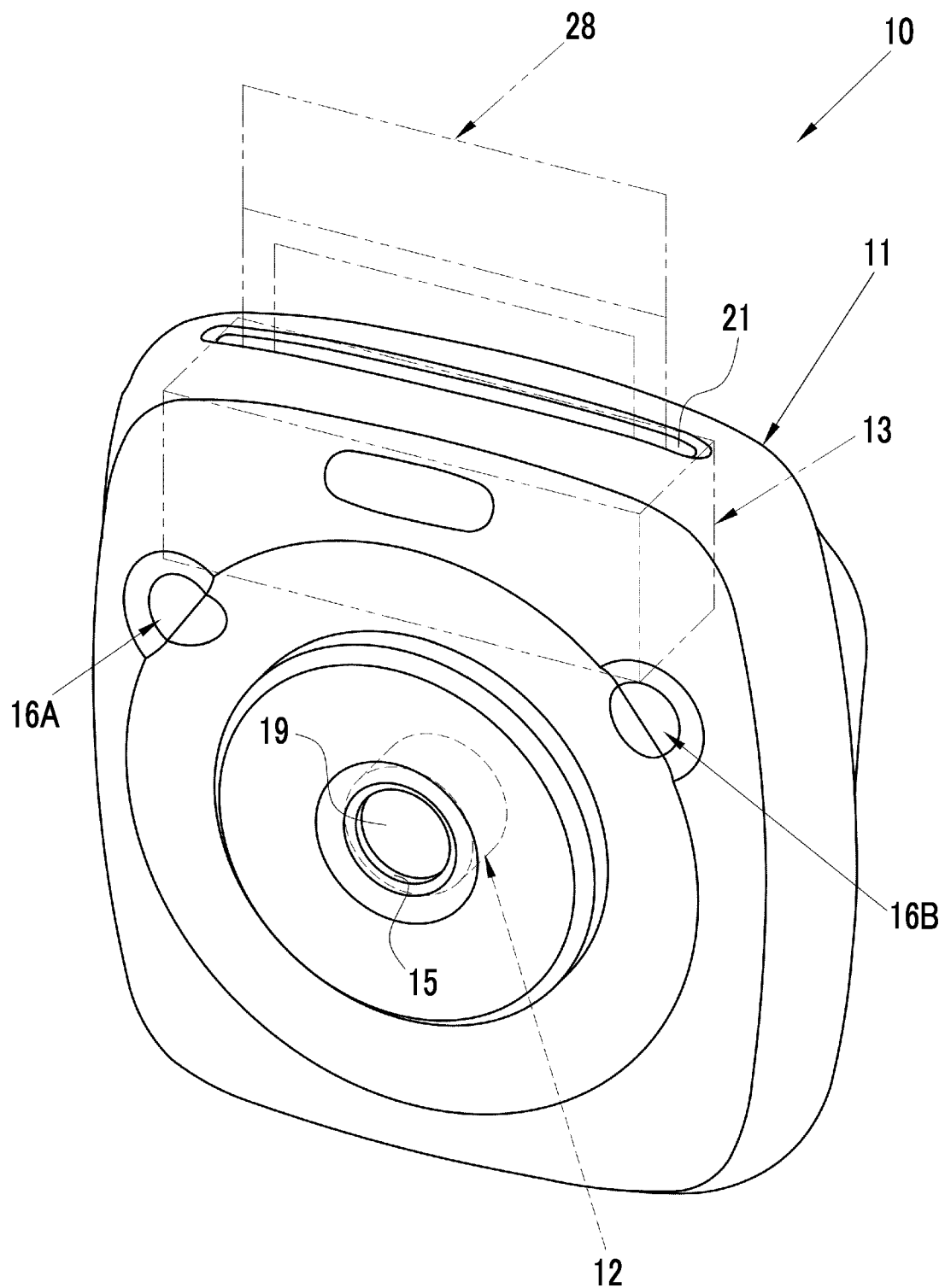
FIG. 1 is a front perspective view of a camera with a printer.

In FIG. 1, a camera 10 with a printer according to an embodiment of the present invention includes a camera body 11, an imaging unit 12, and a printer unit 13. An imaging window 15 and two release switches 16A and 16B are provided on a front surface of the camera body 11. The imaging window 15 is disposed in a center on the front surface of the camera body 11. The imaging window 15 exposes an imaging optical system 19 (see FIG. 2) constituting the imaging unit 12.

The camera body 11 has a substantially square shape viewed from the front surface. The camera 10 with a printer uses an instant film 28 (see FIG. 10) as a sheet-shaped recording medium. The instant film 28 is a wide-type instant film having a dimension in a width direction longer than a dimension in a transport direction.

Figure 2:
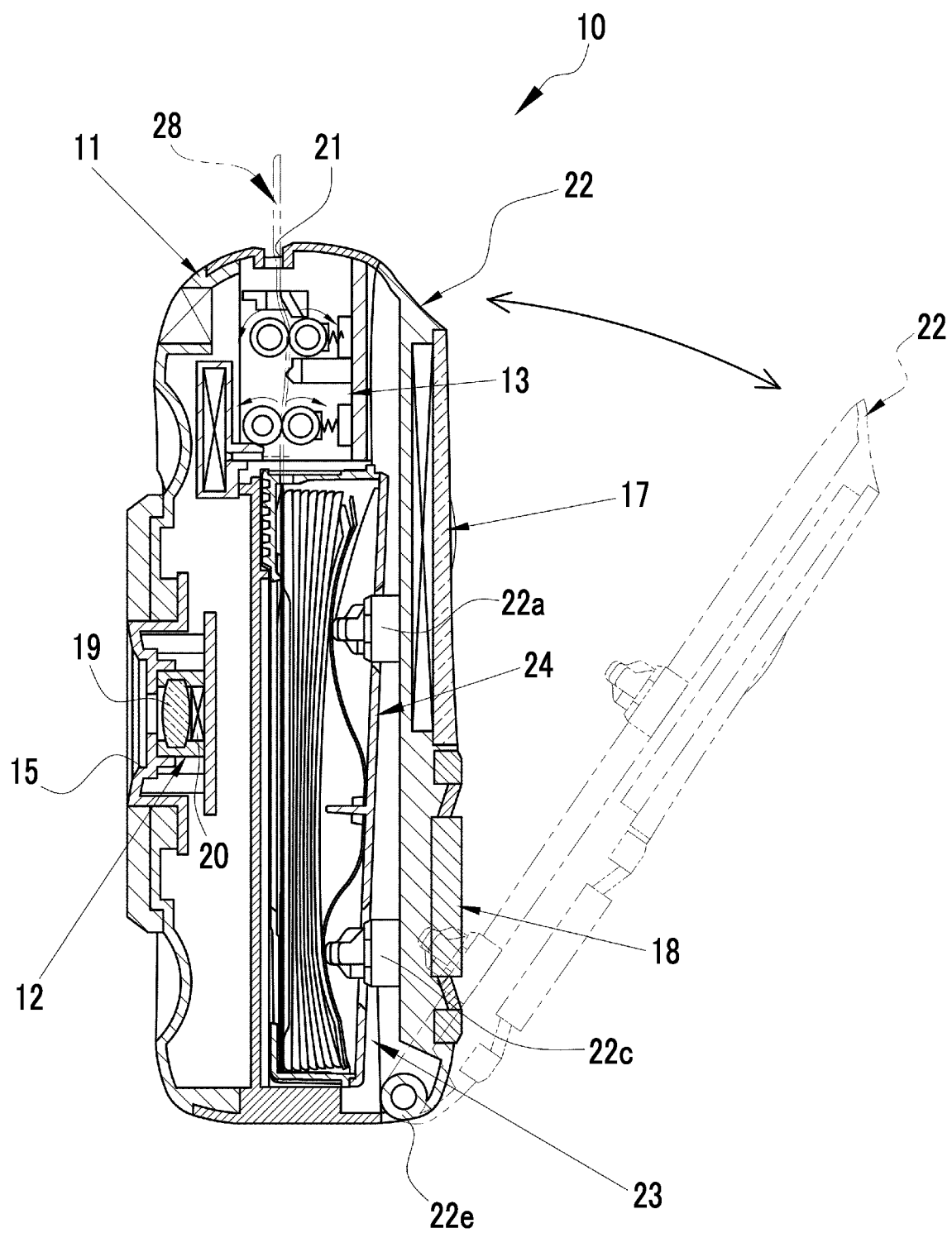
FIG. 2 is a central longitudinal cross-sectional view of the camera with a printer.

As shown in FIG. 2, the imaging optical system 19 and a solid-state imaging element 20 are provided in the imaging unit 12. For example, the solid-state imaging element 20 is a complementary metal-oxide-semiconductor (CMOS) image sensor, and includes a light-receiving surface constituted by a plurality of pixels (not shown) arranged in a two-dimensional matrix shape. Each pixel includes a photoelectric conversion element, photoelectrically converts a subject image formed on the light-receiving surface by the imaging optical system 19, and generates an imaging signal.

The solid-state imaging element 20 includes signal processing circuits (all not shown) such as a noise removal circuit, an auto gain controller, and an A/D conversion circuit. The noise removal circuit performs a noise removal process on the imaging signal. The auto gain controller amplifies a level of the imaging signal to an optimum value. The A/D conversion circuit converts the imaging signal into a digital signal, and outputs the digital signal to a built-in memory (not shown) from the solid-state imaging element 20. An output signal of the solid-state imaging element 20 is image data (so-called RAW data) having one color signal for each pixel.

The solid-state imaging element 20 is driven by pressing at least one of the release switch 16A or 16B, and the subject image is captured. A film discharge port 21 is provided in a top surface of the camera body 11. The instant film 28 on which an image has been printed is discharged from the film discharge port 21.

Figure 3:
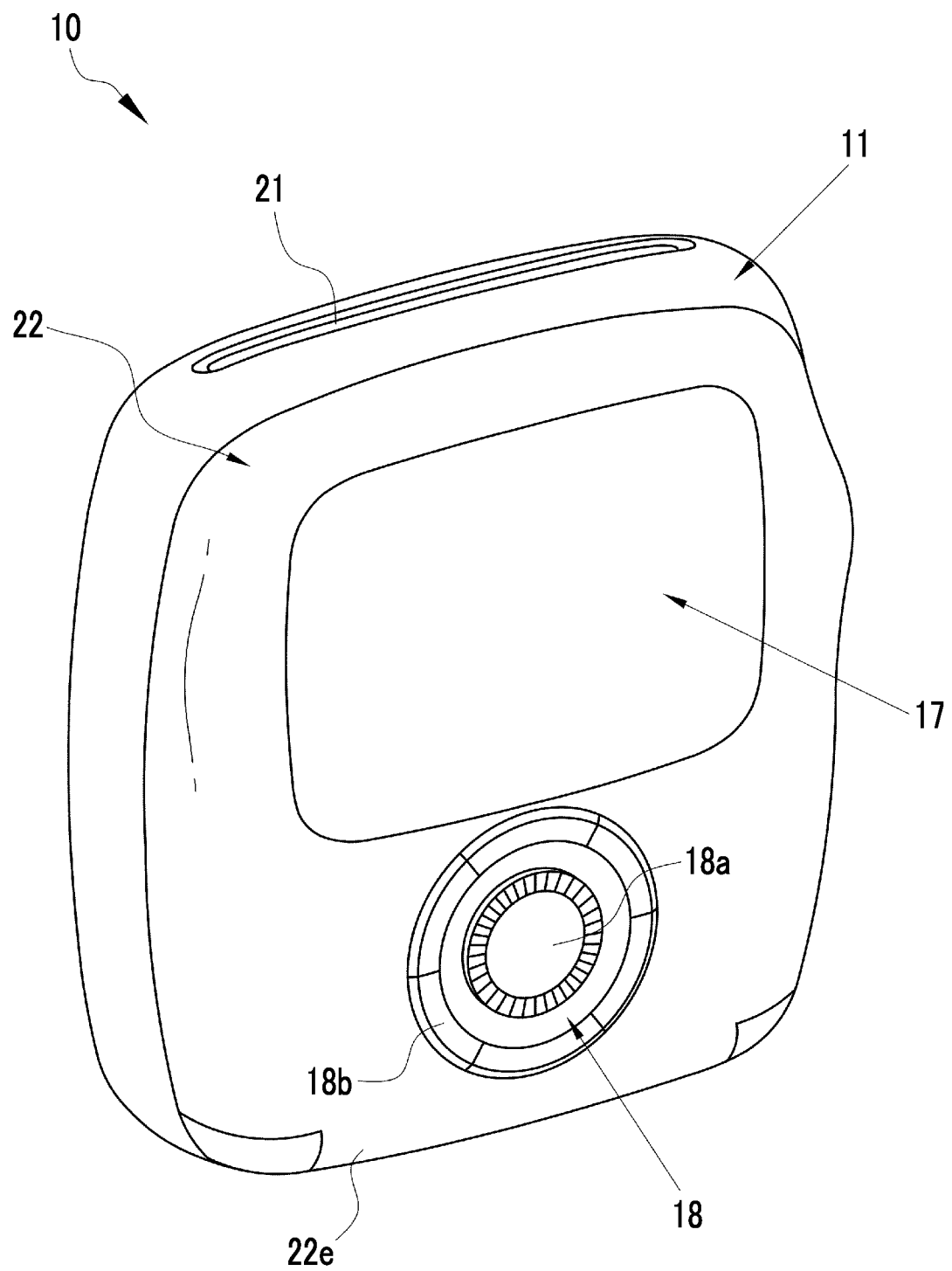
FIG. 3 is a rear perspective view of the camera with a printer with a loading lid in a closed position.

As shown in FIG. 3, a loading lid 22 is attached to a rear surface side of the camera body 11 through a hinge portion 22e. The hinge portion 22e rotatably supports the loading lid 22 between an opened position (state shown in FIG. 4) and a closed position (state shown in FIG. 3). A locking mechanism and an unlocking mechanism (all not shown) are provided between the camera body 11 and the loading lid 22, and in a case where the locking mechanism holds the loading lid 22 in the closed position and operates the unlocking mechanism, the loading lid 22 moves rotationally from the closed position to the opened position.

Figure 4:
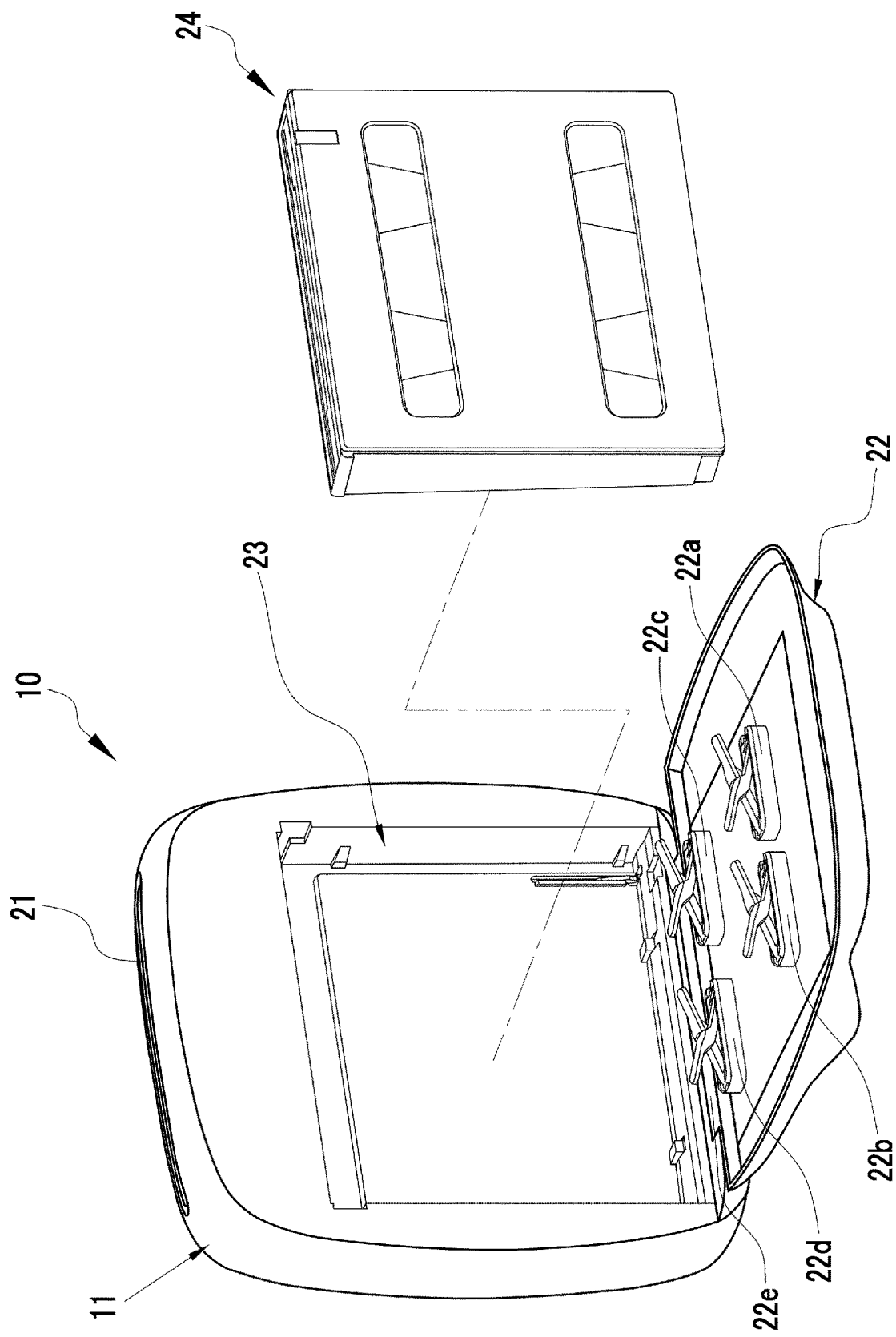
FIG. 4 is a rear perspective view of the camera with a printer with the loading lid in an opened position.

As shown in FIG. 4, an instant film pack 24 (recording medium pack) accommodating the instant film 28 is loaded into a loading room 23. A plurality of film holding portions 22a to 22d are provided on an inner surface of the loading lid 22.

A rear display unit 17 and an operating part 18 are provided on an outer surface of the loading lid 22, that is, a rear surface of the camera body 11. The rear display unit 17 is, for example, a liquid crystal display (LCD) panel. Image data corresponding one frame output from the solid-state imaging element 20 is sequentially input into the rear display unit 17, and are displayed as a live preview image.

A photographer presses at least one of the release switch 16A or 16B, and thus, capturing is started. Image data is acquired from the solid-state imaging element 20 through the capturing. An image processing unit (not shown) performs known image processing on the image data, and then the image data is compressed. Examples of the image processing include matrix operation, demosaicing, γ correction, luminance conversion, color difference conversion, and resizing. The image data on which the image processing and the compression are performed are recorded in a built-in memory (not shown) such as a flash memory provided within the camera body 11.

In a case where a menu switch 18a of the operating part 18 is pressed, the image is played and displayed on the rear display unit 17 based on the image data recorded in the built-in memory. In a case where an image desired to be printed is displayed on the rear display unit 17, the photographer presses a print switch 18b of the operating part 18, and thus, a printing process by the printer unit 13 is started.

Configuration of Instant Film Pack

Figure 5:
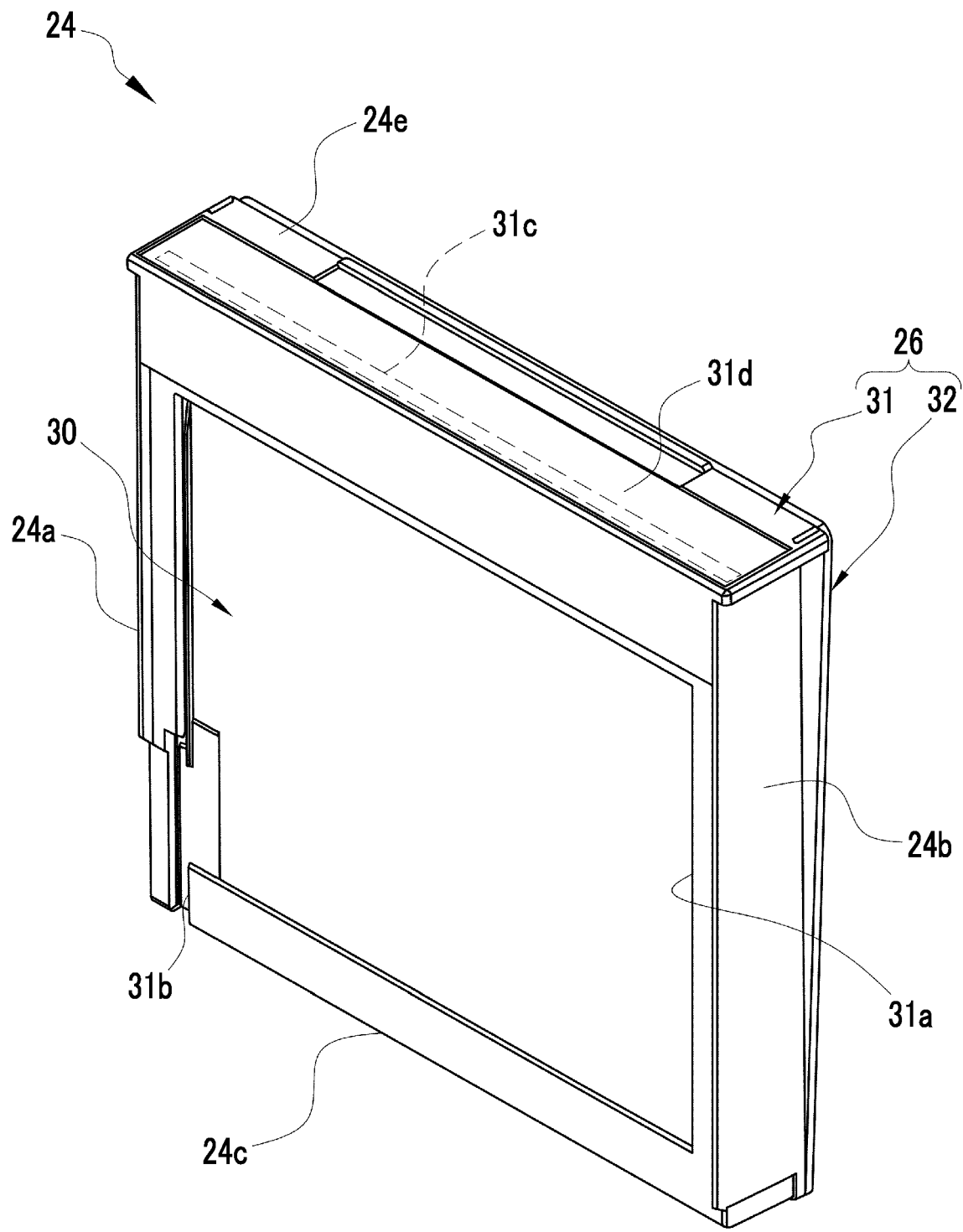
FIG. 5 is a perspective view of an instant film pack.
Figure 6:
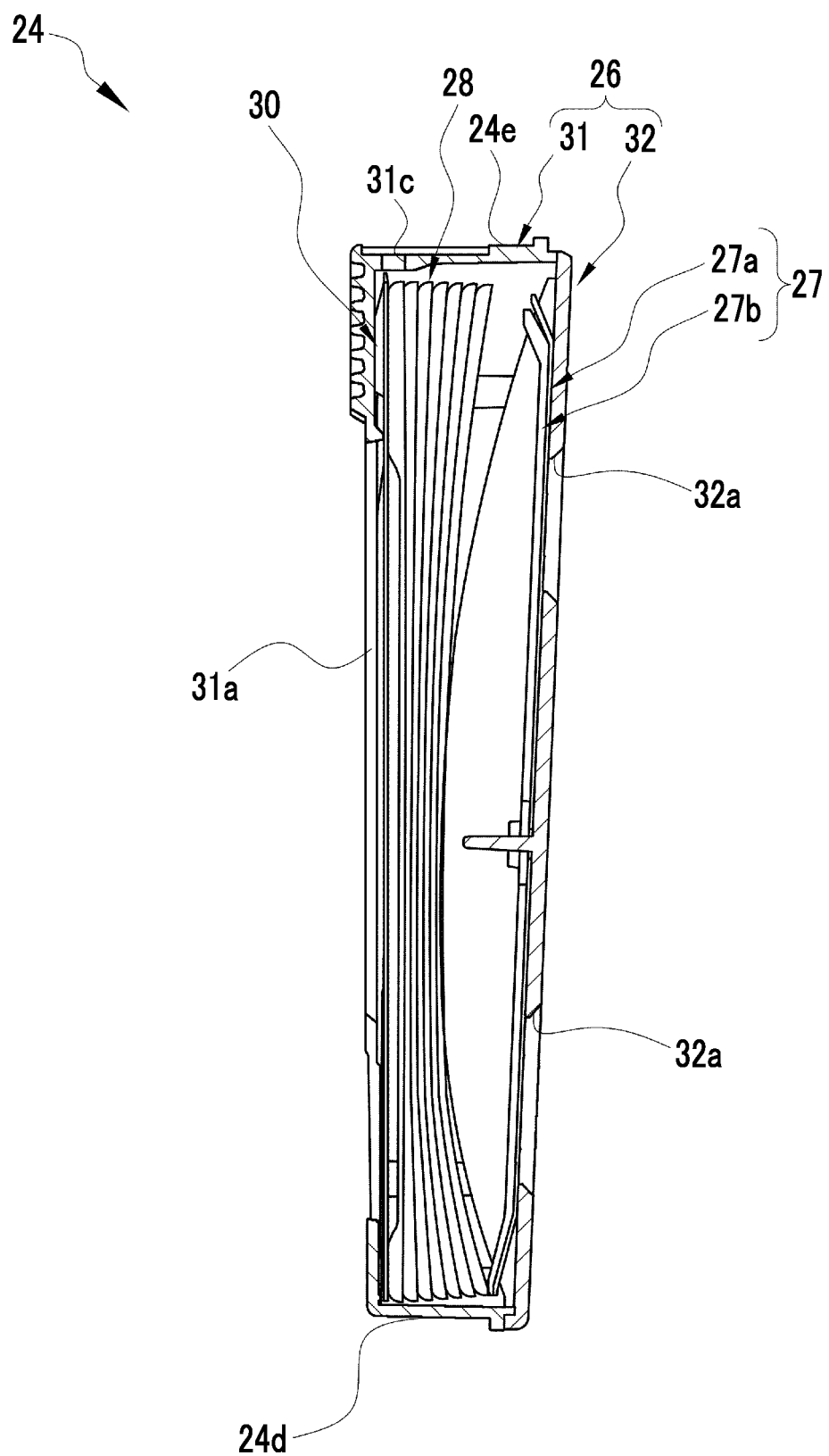
FIG. 6 is a cross-sectional view of the instant film pack.

As shown in FIGS. 5 and 6, the instant film pack 24 includes a case 26, a film press plate 27, a plurality of instant films 28, and a film cover 30.

As shown in FIG. 6, the case 26 accommodates the plurality of instant films 28 and one film cover 30 in a stacking manner. The case 26 is made of a material such as a thermoplastic resin or a paper resin acquired by mixing the thermoplastic resin with cellulose. The case 26 includes a box-shaped case member 31, and a lid 32 that covers an opening formed in a rear surface side of the case member 31.

Figure 7:
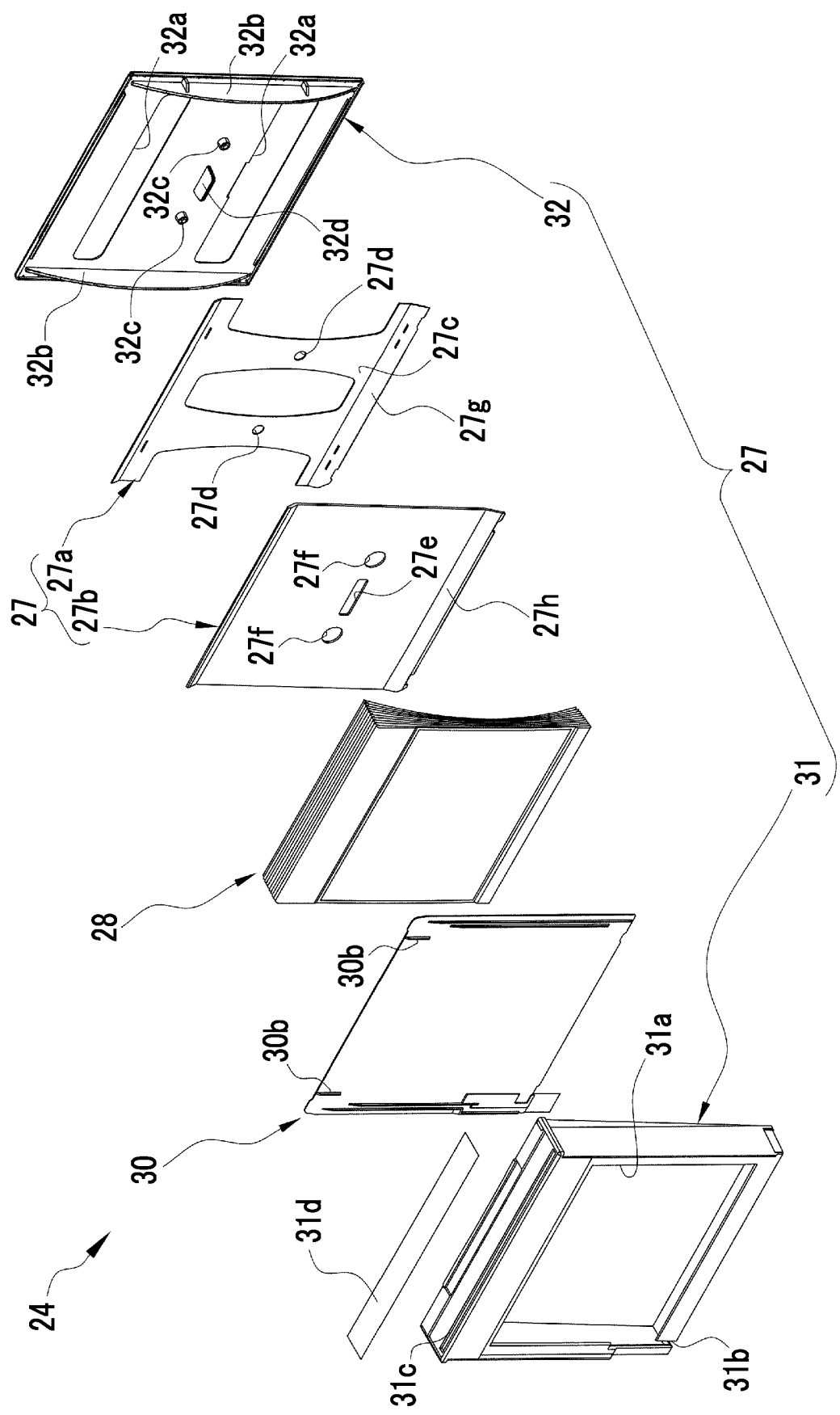
FIG. 7 is an exploded perspective view of the instant film pack.

As shown in FIG. 7, an exposure aperture 31a for exposing the instant film 28 is formed in the case member 31. In the following description, a surface of the instant film pack 24 in which the exposure aperture 31a is formed is a "front surface", a surface opposite to the "front surface" is a "rear surface", a surface facing the film discharge port 21 of the camera body 11 is a "top surface", and a surface opposite to the "top surface" is a "bottom surface". The film cover 30 is overlapped before the instant film 28 positioned in a foremost layer initially set in the exposure aperture 31a within the case member 31. Accordingly, the exposure aperture 31a is light tightly blocked by the film cover 30. A cut-off portion 31b into which a known claw member 57 (see FIGS. 11, 12, and 13) formed at the camera is inserted is formed in a lower portion of the exposure aperture 31a. The cut-off portion 31b is a cut-off portion in a straight line through which the claw member 57 passes in a case where the instant film 28 or the film cover 30 is sent out. The cut-off portion 31b is connected from the lower portion of the exposure aperture 31a to a bottom surface of the case member 31.

A discharge port 31c is formed in a top surface of the case member 31. The discharge port 31c is formed in a slit shape. The instant films 28 or the film cover 30 are sent out one by one outwards from the instant film pack 24 by the claw member 57 inserted into the cut-off portion 31b of the case member 31 through the discharge port 31c.

A light shielding seal 31d is pasted onto the case member 31 so as to close the discharge port 31c from the outside. The light shielding seal 31d is formed as a flexible sheet. The light shielding seal 31d is pasted onto only one edge of a long side of the discharge port 31c so as not to hinder the instant film 28 or the film cover 30 when the instant film or the film cover passes through the discharge port 31c.

Figure 8:
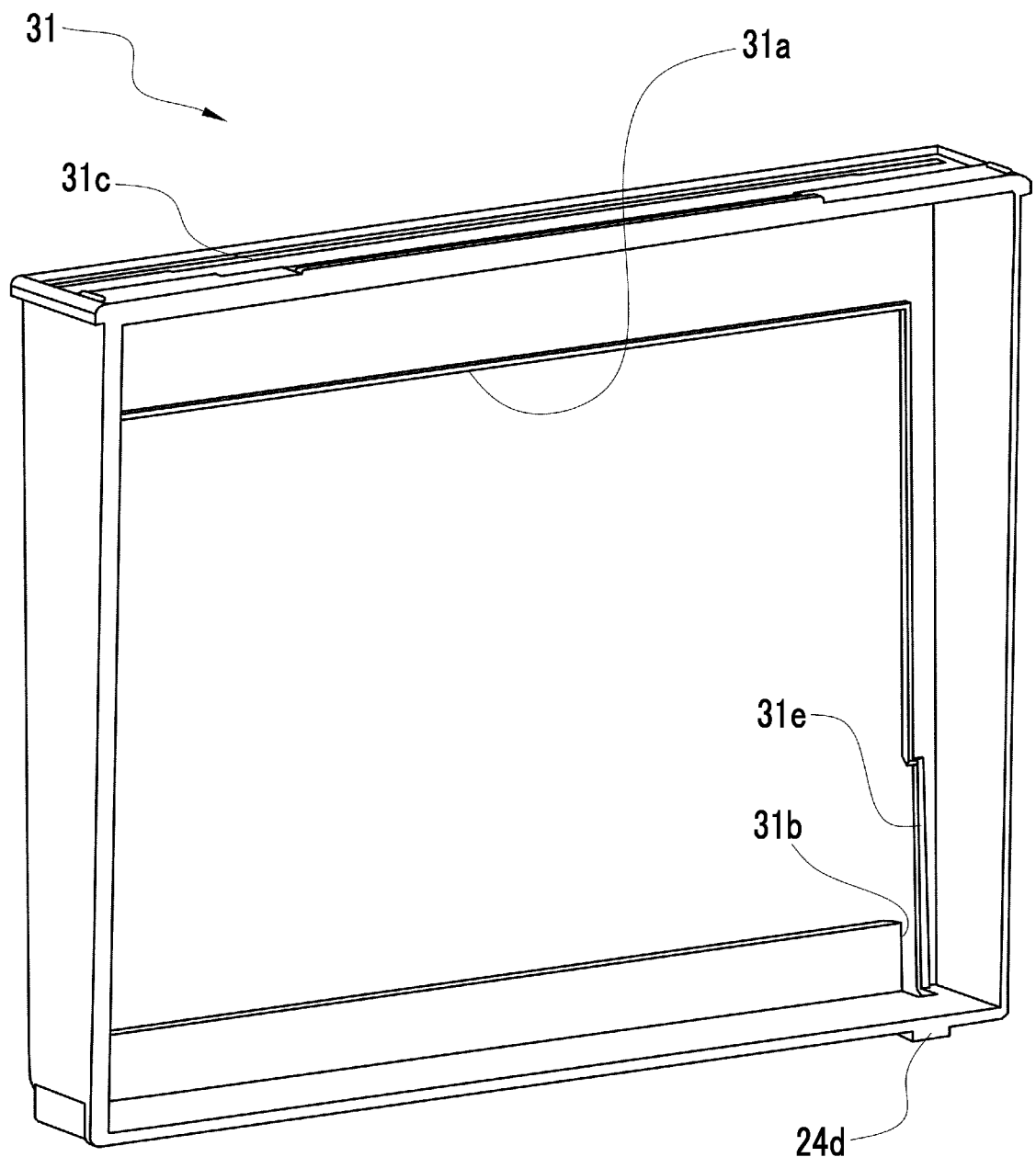
FIG. 8 is a perspective view of a case member of the instant film pack as viewed from a rear surface side.

As shown in FIG. 8, a film pack side rib 31e is provided on a back side of a front surface of the case member 31. The film pack side rib 31e is disposed along the cut-off portion 31b and protrudes from the back side of the front surface to the rear surface side of the case member 31.

Figure 9:
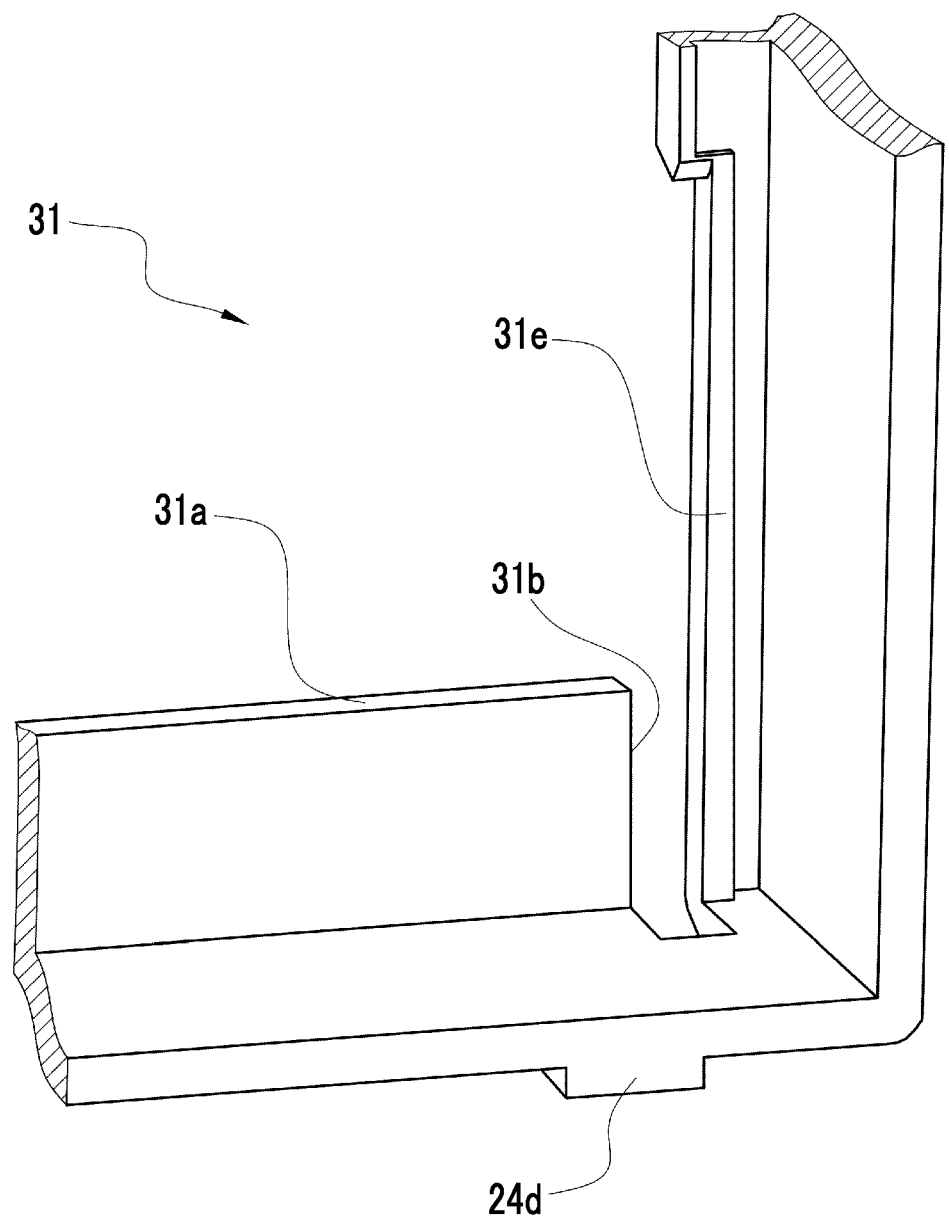
FIG. 9 is a partially enlarged perspective view of a part of the case member viewed from the rear surface side.

As shown in FIG. 9, the film pack side rib 31e is formed into a straight line like the cut-off portion 31b. Specifically, the film pack side rib 31e is a square columnar rib disposed in parallel with the cut-off portion 31b. As described above, since the cut-off portion 31b is connected to the exposure aperture 31a, the film pack side rib 31e formed along the cut-off portion 31b is in contact with the exposure aperture 31a.

As shown in FIG. 7, the lid 32 includes a pair of openings 32a, a pair of unit support protrusions 32b, a pair of caulking pins 32c, and a support piece 32d. The pair of openings 32a are formed so as to be vertically spaced apart from each other by a predetermined interval, and serve as an entrance into which the film holding portions 22a provided in the camera 10 with a printer are inserted when the camera 10 with a printer is loaded.

The pair of unit support protrusions 32b are provided at both side edge portions of the lid 32 so as to be vertically long, and each has an arc shape of which a center portion protrudes toward the exposure aperture 31a. The unit support protrusions 32b touch both side edge portions on a rear surface of the instant film 28 positioned in a last layer, and push up the instant film 28 by each having the arc shape of which the center portion protrudes toward the exposure aperture 31a. Accordingly, a gap between the film cover 30 and the exposure aperture 31a is prevented from being formed.

The pair of caulking pins 32c are used for attaching the film press plate 27. The support piece 32d supports a center portion of the instant film 28 positioned in the last layer from behind, and prevents the instant film 28 from being curved in a direction in which the center portion is curved toward the lid 32.

The film press plate 27 includes two elastic sheets 27a and 27b made of a synthetic resin. The sheet 27a is pressed by the plurality of film holding portions 22a when the loading lid 22 is closed, and is curved so as to protrude toward the lid 32. An opening 27c and a pair of holes 27d are formed in the sheet 27a. The opening 27c is formed in a center portion of the sheet 27a so as to be vertically long, and the support piece 32d is inserted into this opening. The pair of caulking pins 32c are inserted into the pair of holes 27d, and the pair of holes is used for attaching the film press plate 27 to the lid 32.

An opening 27e and a pair of holes 27f are formed in the sheet 27b. The opening 27e is formed in a center portion of the sheet 27a, and the support piece 32d is inserted into this opening. The pair of caulking pins 32c are inserted into the pair of holes 27f. A lower end part 27h of the sheet 27b is attached to a lower end part 27g of the sheet 27a. Accordingly, the sheet 27b prevents the sheet 27a from being slack, and prevents light leak from the pair of openings 32a. The sheet 27b pushes up the instant film 28 in a substantially planar manner when the sheet 27a is elastically bent by the plurality of film holding portions 22a. As a result, the film cover 30 positioned in the foremost layer or the instant film 28 is pressed to the back side of the front surface of the case member 31.

Both side surfaces 24a and 24b of the instant film pack 24 touch positioning protrusions 23h of the loading room 23 to be described below. A reversal loading prevention protrusion 24d is provided on a bottom surface 24c (see FIGS. 8 and 9) of the instant film pack 24. The protrusion 24d is disposed at a position close to one side surface 24a with respect to a center line in a width direction X of the instant film pack 24. The protrusion 24d is integrally formed with the case member 31 of the instant film pack 24. The protrusion 24d is formed in a cuboid shape protruding from the bottom surface 24c of the instant film pack 24.

Configuration of Instant Film

Figure 10:
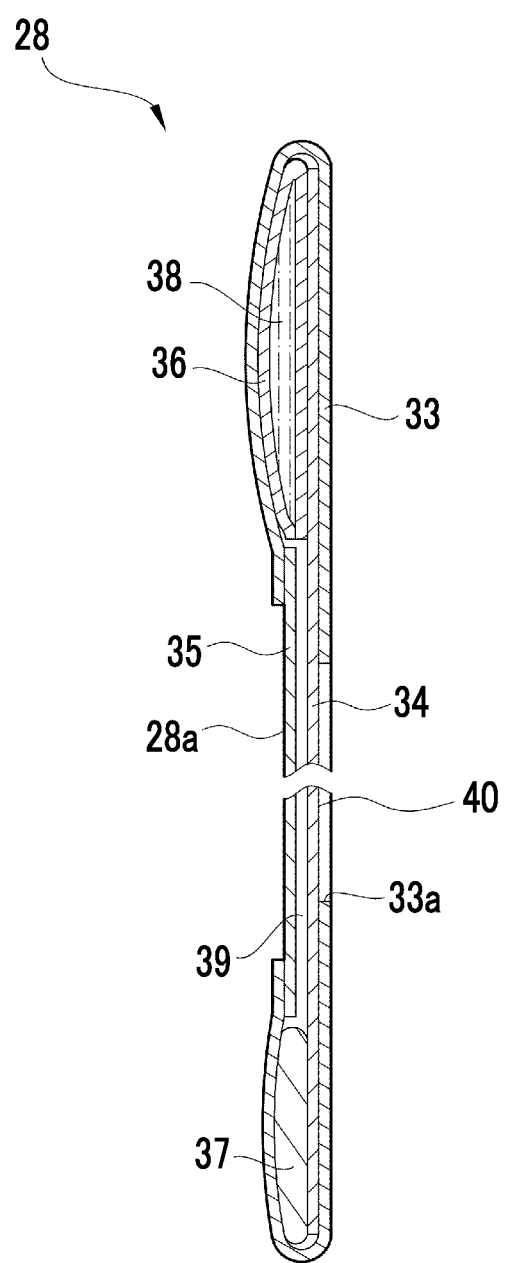
FIG. 10 is a cross-sectional view of the instant film.

As shown in FIG. 10, the instant film 28 includes a mask sheet 33, a photosensitive sheet 34, a cover sheet 35, a developer pod 36, and a trap portion 37, and is a so-called monosheet type film. The mask sheet 33 is formed as a sheet made of a thin synthetic resin, and includes a screen opening 33a. A photosensitive layer, a diffusion reflective layer, an image receiving layer, and the like are provided in the photosensitive sheet 34. The cover sheet 35 includes an exposure surface 28a facing an exposure head 50 to be described below.

The developer pod 36 is formed in a substantially bag shape, and contains a developer 38 therein. The developer pod 36 is pasted onto an end part of the photosensitive sheet 34 close to the discharge port 31c, and is wrapped by an end part of the mask sheet 33. The trap portion 37 is pasted onto an end part of the photosensitive sheet 34 opposite to the discharge port 31c, and is similarly wrapped by the end part of the mask sheet 33.

The photosensitive layer of the instant film 28 is irradiated with print light at the time of printing, and thus, the photosensitive layer is exposed. The developer pod 36 is torn at the time of development, and the developer 38 flows and is spread into a gap 39 between the photosensitive sheet 34 and the cover sheet 35. An image acquired through the exposure of the photosensitive layer is reversed by the diffusion reflective layer, and is transferred to the image receiving layer. By doing this, a positive image appears on a positive image observation surface 40 of the photosensitive sheet 34 exposed through the screen opening 33a.

The film cover 30 is formed as a sheet thinner than the instant film 28, and has light shielding properties and flexibility. The film cover 30 is a molded item made of a synthetic resin, and is made, for example, of polystyrene containing carbon black. That is, the film cover 30 has rigidity higher than the instant film 28. In a case where the instant film pack 24 is loaded into the loading room 23 and is used, the film cover 30 is discharged to the film discharge port 21 by a spreading roller pair 54 (see FIGS. 11 and 12) to be described later.

Configuration of Printer Unit

Figure 11:
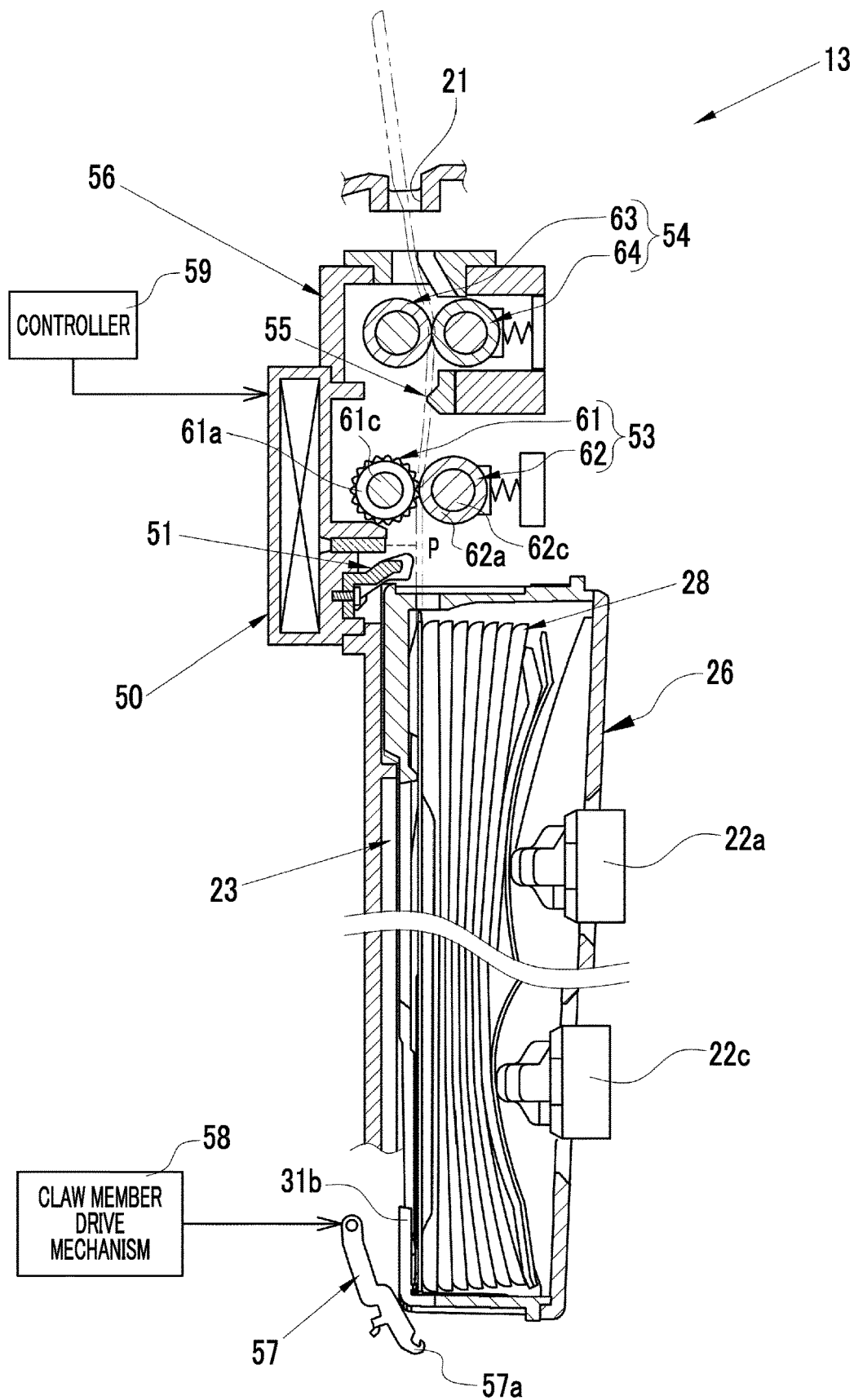
FIG. 11 is a cross-sectional view of a printer unit.
Figure 12:
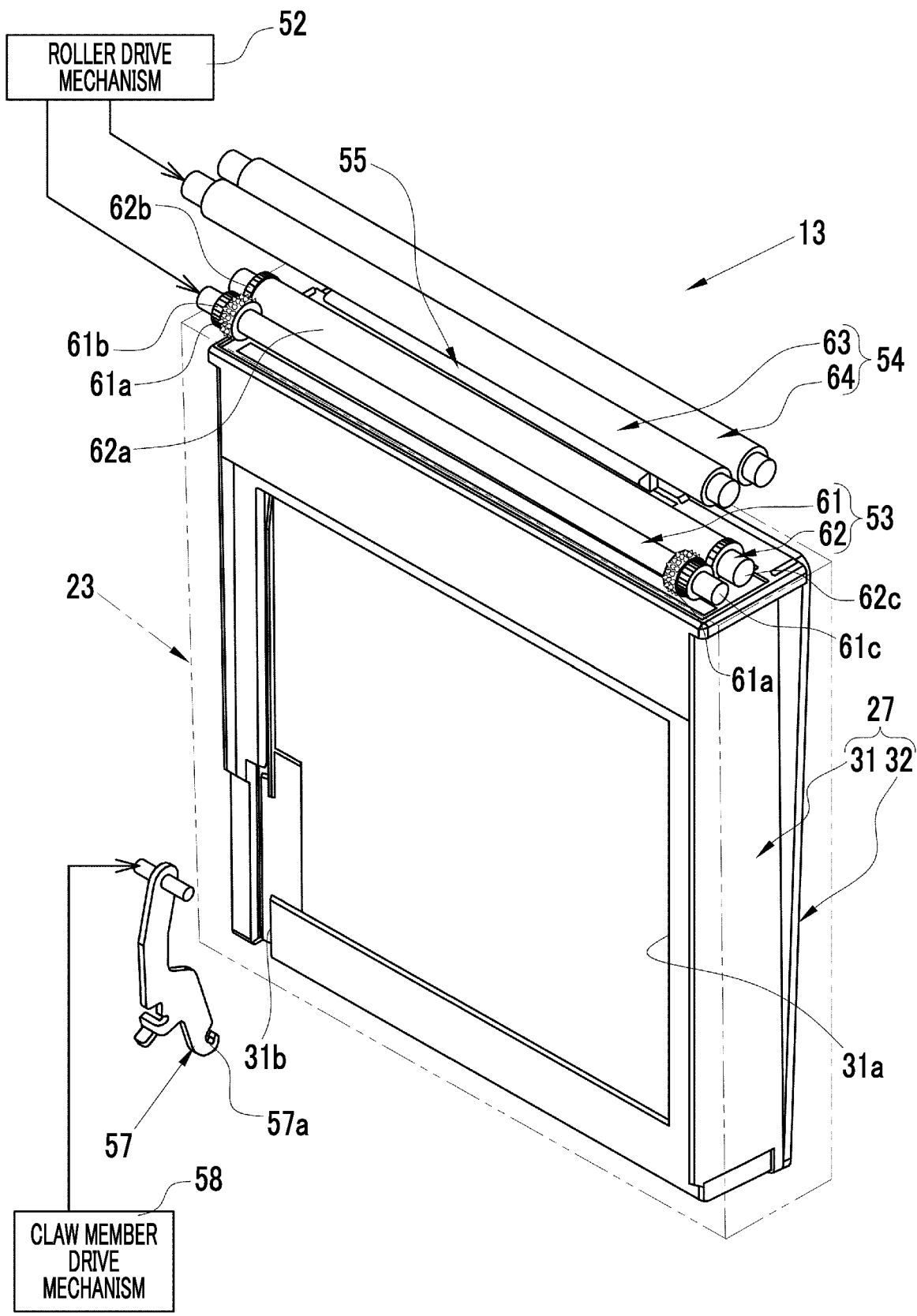
FIG. 12 is a perspective view of the printer unit in which a device housing is omitted.

As shown in FIGS. 11 and 12, the printer unit 13 includes the exposure head 50, a film support member 51, a roller drive mechanism 52, a transport roller pair 53, the spreading roller pair 54, a spreading control member 55, a device housing 56 (see FIG. 13), the claw member 57, a claw member drive mechanism 58, and a controller 59.

In FIG. 12, although the device housing 56 and the like are omitted in order to avoid complication, in reality, the printer unit 13 is constituted by attaching the exposure head 50, the film support member 51, the roller drive mechanism 52, the transport roller pair 53, the spreading roller pair 54, the spreading control member 55, the claw member 57, the claw member drive mechanism 58, and the like to the device housing 56.

Hereinafter, a transport direction in which the transport roller pair 53 transports the instant film 28 is a Y direction, a width direction of the instant film 28 orthogonal to the Y direction is an X direction, and a direction orthogonal to the X direction and the Y direction is a Z direction.

Figure 13:
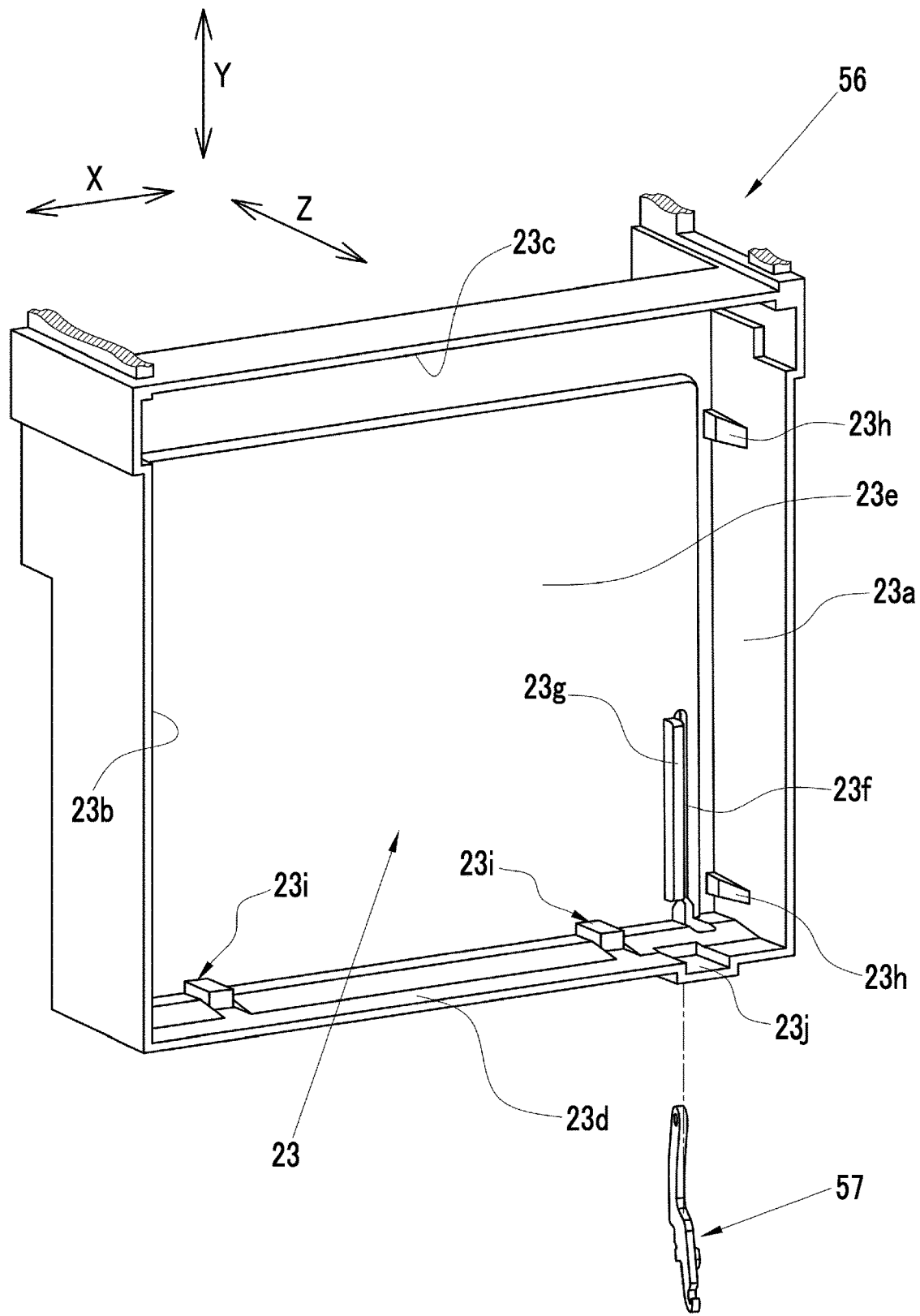
FIG. 13 is a perspective view of the device housing.

As shown in FIG. 13, the device housing 56 is formed in a box shape in which the rear surface side of the camera body 11 is opened, and the loading room 23 is integrally provided. In addition to the loading room 23, the device housing 56 has a frame portion that supports the exposure head 50, the roller drive mechanism 52, the transport roller pair 53, the spreading roller pair 54, the claw member 57, and the like, but these components are omitted in FIG. 13. The device housing 56 is made of a resin material.

As described above, the instant film pack 24 is loaded into the loading room 23. An image is recorded on the instant film 28 discharged from the instant film pack 24 by the printer unit 13. A shape of the loading room 23 and the like will be described later.

Configuration of Transport Roller Pair and Spreading Roller Pair

The transport roller pair 53 and the spreading roller pair 54 are pivotally supported by a bearing portion (not shown) provided in the device housing 56. The transport roller pair 53 and the spreading roller pair 54 are driven to be rotated by the roller drive mechanism 52, and transport the film cover 30 and the instant film 28. The roller drive mechanism 52 includes, for example, a motor as a drive source and a drive transmission gear train that transmits rotational drive force.

The transport roller pair 53 includes a capstan roller 61 and a pinch roller 62. The capstan roller 61 and the pinch roller 62 are arranged at positions at which these rollers pinch a transport passage of the instant film 28 (see FIG. 11). The capstan roller 61 includes a pair of columnar spike roller members 61a, a drive gear 61b, and a rotary shaft 61c that holds each spike roller member 61a and the drive gear 61b.

The pinch roller 62 includes a roller member 62a, a drive gear 62b, and a rotary shaft 62c. The drive gears 61b and 62b are provided at both end parts of the rotary shafts 61c and 62c and mesh with each other. A motor is connected to one end of the rotary shaft 61c via a drive transmission gear train. Thus, in a case where the motor rotates, the capstan roller 61 and the pinch roller 62 rotate in synchronization with each other. The instant film 28 discharged from the instant film pack 24 is transported toward the spreading roller pair 54 by the transport roller pair 53.

The spreading roller pair 54 includes spreading rollers 63 and 64, and is disposed on a downstream side of the transport roller pair 53 in the transport direction. The spreading roller 63 is disposed on a side of the instant film 28 facing the exposure surface 28a. The spreading roller 64 is disposed on a side of the instant film 28 facing the image observation surface 40. A motor is connected to one end of the spreading roller 63 or 64 via a drive transmission gear train. Thus, in a case where a DC motor rotates, the spreading rollers 63 and 64 rotate in synchronization with each other.

The spreading roller pair 54 transports the instant film 28 transported by the transport roller pair 53 toward the film discharge port 21 while sandwiching the instant film over the entire width. The instant film is sandwiched by the spreading roller pair 54, and thus, the developer pod 36 of the instant film 28 is crushed. Accordingly, the developer is spread (unfolded) into the gap 39 (see FIG. 10).

The spreading control member 55 (see FIG. 11) is provided between the transport roller pair 53 and the spreading roller pair 54. The spreading control member 55 touches the positive image observation surface 40 of the instant film 28 that has been transported, and controls the distribution of the developer being spread by rubbing the positive image observation surface 40 of the instant film 28. The spreading control member 55 is fixed to the device housing 56 via a support member (not shown).

The transport roller pair 53 transports the instant film 28 sent out from the instant film pack 24 by the claw member 57 toward the film discharge port 21. An exposure position P (see FIG. 11) at which the exposure head 50 exposes the instant film 28 to the print light is positioned between the discharge ports 31c of the instant film pack 24 and the transport roller pair 53. The exposure using the exposure head 50 is performed for a period during which the instant film 28 is transported by the transport roller pair 53.

The controller 59 controls the exposure of the exposure head 50 based on the image data. The exposure by the exposure head 50 is performed by sequentially exposing line images on the instant film 28 while moving the instant film 28 for each line. Accordingly, an image corresponding to a single screen is exposed on the photosensitive layer of the instant film 28. The instant film 28 is subsequently transported toward the spreading roller pair 54 by the transport roller pair 53.

Configuration of Film Holding Portion

In a case where the loading lid 22 is in the opened position, the loading room 23 is opened (the state shown in FIG. 4), and in a case where the loading lid 22 is in the closed position, the loading lid 22 covers the opened rear surface of the loading room 23 (the state shown in 3). The instant film pack 24 is positioned in the X direction and the Y direction with respect to the loading room 23, and is further positioned in the Z direction by positioning the loading lid 22 in the closed position. Specifically, the plurality of film holding portions 22a to 22d provided at the loading lid 22 are positioned in the Z direction with respect to the instant film pack 24.

Figure 17:
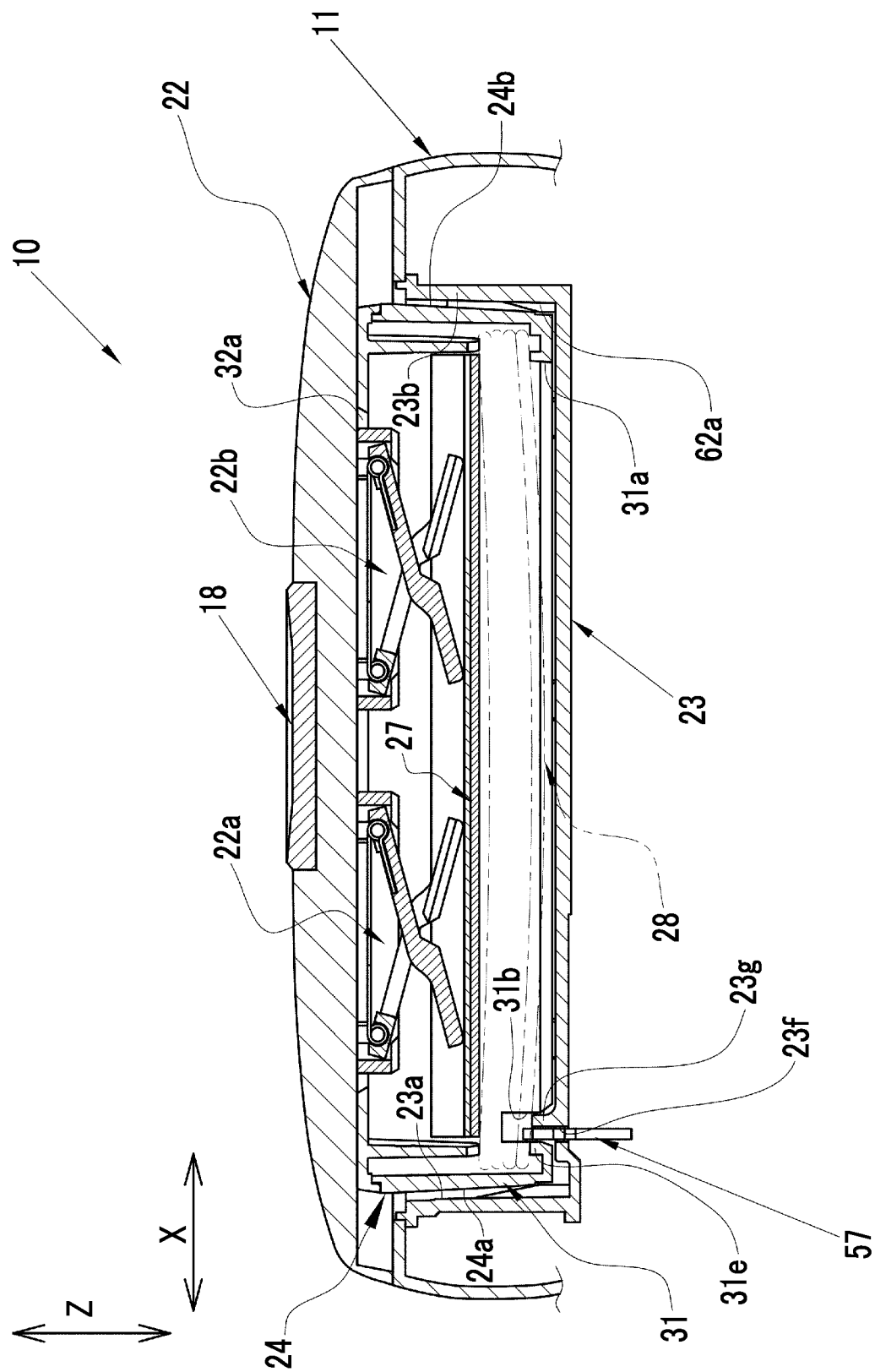
FIG. 17 is a cross-sectional view of a main part of the camera with a printer cut along a width direction and a front-back direction, and is a cross-sectional view of a main part cut at an edge part of a loading room side rib and the claw member.

That is, in a case where the instant film pack 24 is loaded into the loading room 23 and the loading lid 22 is positioned in the closed position, the plurality of film holding portions 22a to 22d are inserted into the instant film pack 24 through the opening 32a, and press the film press plate 27 (see FIG. 17). Accordingly, the instant films 28 in the instant film pack 24 are pressed in a stacking direction.

Configuration of Loading Room

As shown in FIG. 13, the loading room 23 has side surfaces 23a and 23b, a top surface 23c, a bottom surface 23d, a front surface 23e (loading room inner surface), a slit 23f, and a loading room side rib 23g. The front surface 23e of the loading room 23 faces the instant film 28 accommodated in the instant film pack 24 in a case where the instant film pack 24 is loaded into the loading room 23. The slit 23f is formed by cutting out a part of the front surface 23e. The claw member 57 described above enters the inside of the case 26 through the slit 23f, and the instant films 28 are sent out of the instant film pack 24 one by one.

The claw member 57 has a hook whose distal end portion 57a is bent in a C shape (see FIG. 11), and the distal end portion 57a engages with and presses against the base end portion of the instant film 28. The claw member 57 is driven straight and rotationally by the claw member drive mechanism 58. The claw member drive mechanism 58 has a known configuration including a motor and a drive transmission gear train.

Figure 14:
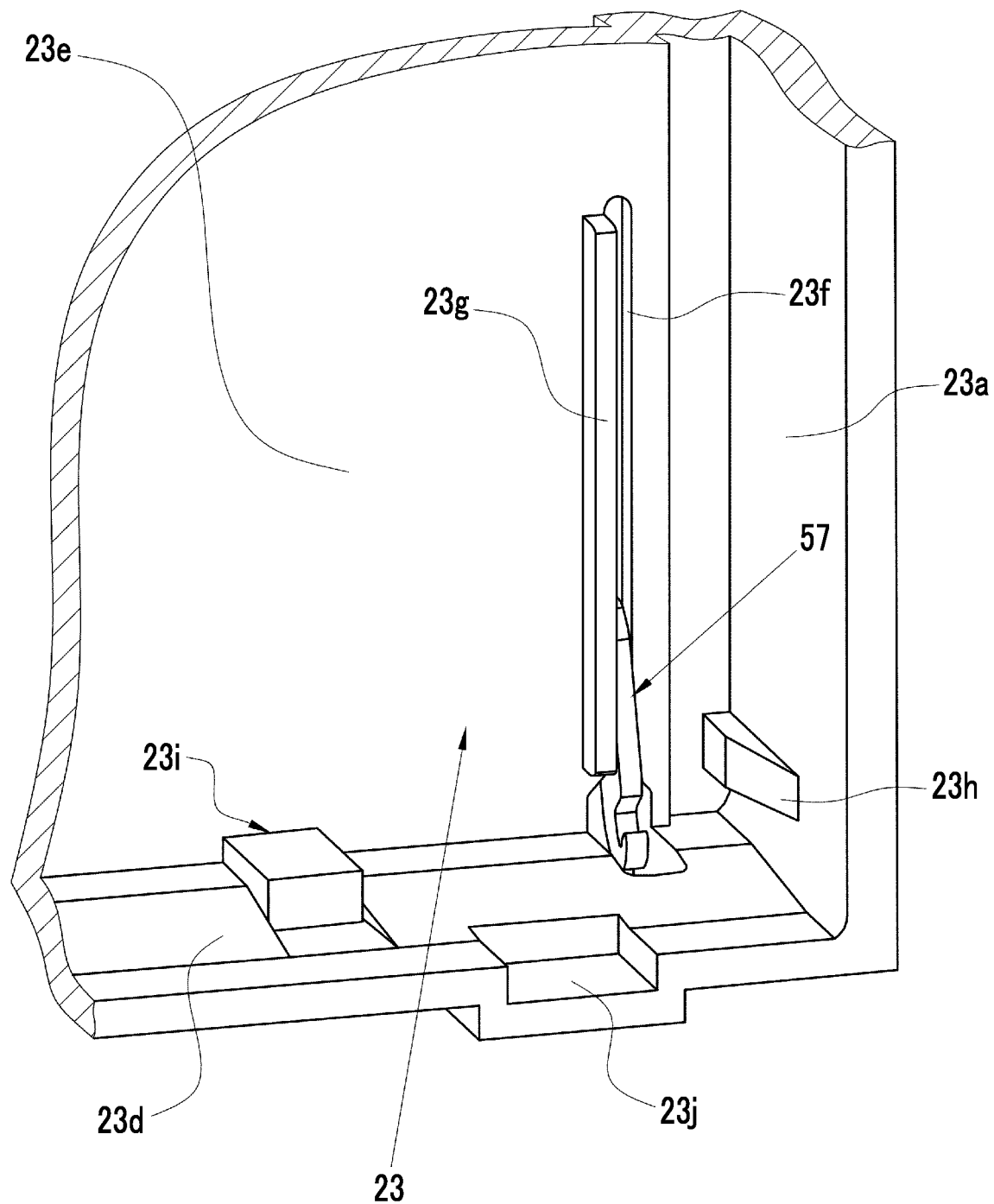
FIG. 14 is a partially enlarged perspective view of a part of a loading room and a claw member as viewed from the rear surface side.
Figure 15:
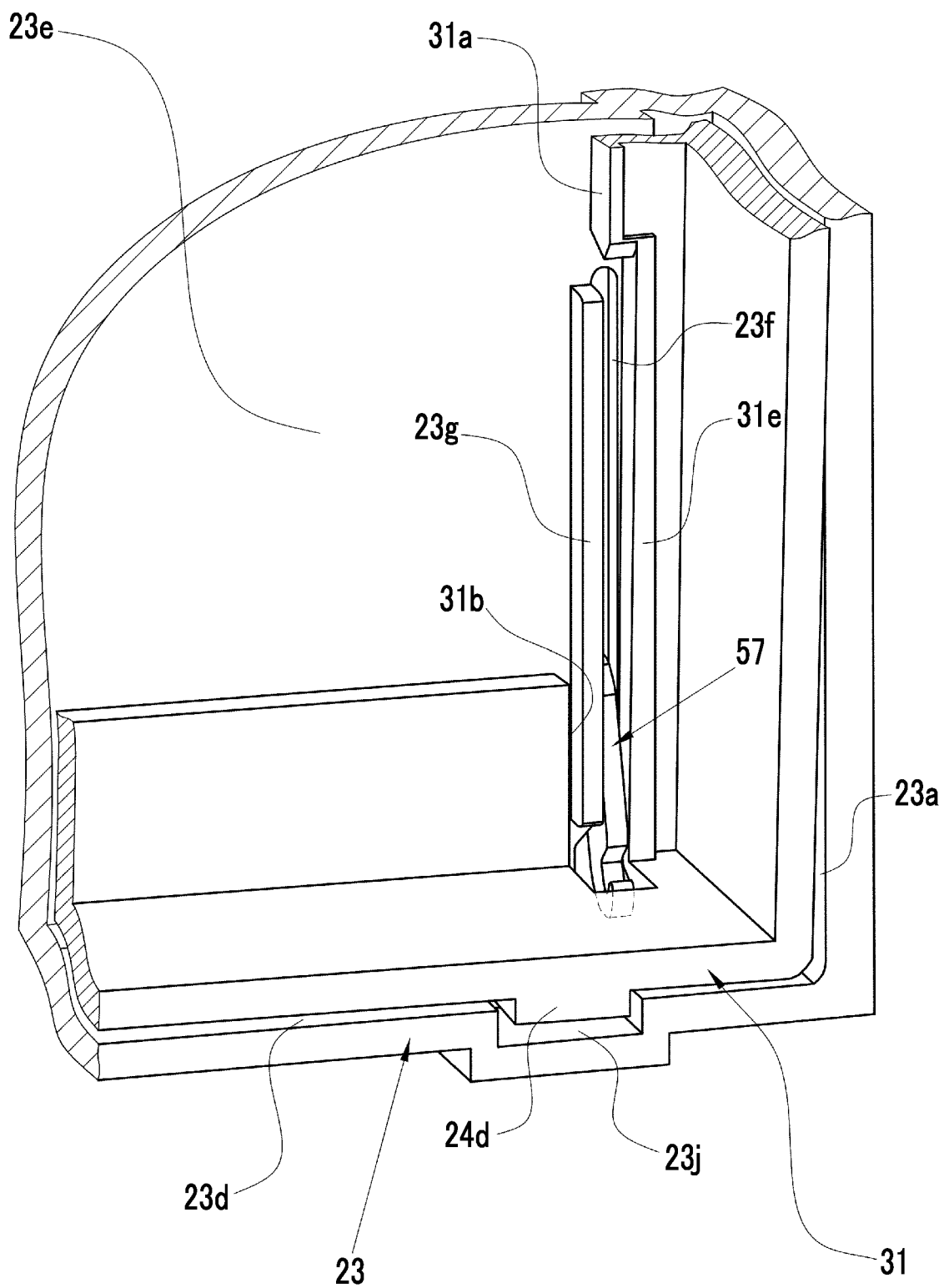
FIG. 15 is a partially enlarged perspective view of a part of the loading room, a part of the case member, and the claw member in a state where the instant film pack is loaded, as viewed from the rear surface side.

As shown in FIG. 14, the loading room side rib 23g is provided so as to protrude from the front surface 23e along the slit 23f. As shown in FIG. 15, the loading room side rib 23g is formed at a position and with a protruding amount where the loading room side rib can be inserted into the instant film pack 24 loaded into the loading room 23. FIG. 15 shows only the case member 31 of the instant film pack 24 loaded into the loading room 23 in order to prevent complication.

The loading room side rib 23g is disposed at a position where the loading room side rib enters the inside of the cut-off portion 31b of the instant film pack 24 in a case where the instant film pack 24 is loaded into the loading room 23. Accordingly, the loading room side rib 23g is disposed at a position where the instant film 28 in the case 26 can be supported in cooperation with the film pack side rib 31e (see FIG. 17).

Figure 16:
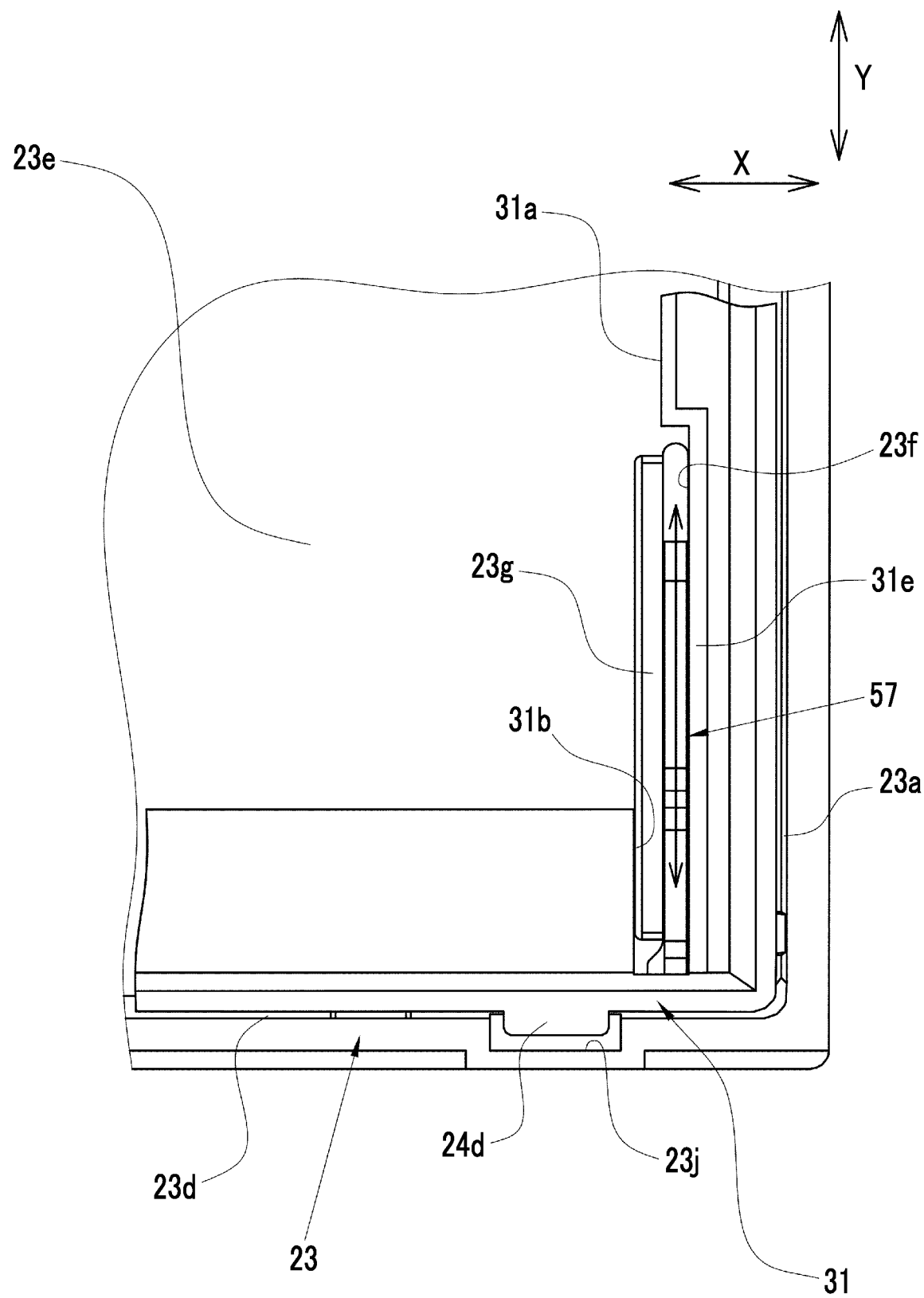
FIG. 16 is a rear view of a part of the loading room, a part of the case member, and the claw member in a state where the instant film pack is loaded.

As shown in FIG. 16, the loading room side rib 23g is disposed at a position where the claw member 57 passes between the loading room side rib and the film pack side rib 31e. The claw member 57 passes between the loading room side rib 23g and the film pack side rib 31e, and sends the instant films 28 out of the instant film pack 24 one by one.

in a case where the instant film pack 24 is loaded into the loading room 23, the loading room side rib 23g has a planar surface on a distal end side facing the instant film 28, and has a square columnar shape disposed in parallel with the film pack side rib 31e.

The positioning protrusions 23h are provided in the loading room 23. The positioning protrusions 23h and the side surfaces 24a and 24b of the instant film pack 24 touch each other, and thus, the instant film pack 24 can be positioned in the X direction.

Elastic members 23i are provided on the bottom surface 23d of the loading room 23. An elastic force in a case where the elastic members 23i try to return from a compressed state to an uncompressed state acts, and a top surface 24e of the instant film pack 24 is pressed against the top surface 23c of the loading room 23. Accordingly, it is possible to position the instant film pack 24 in the Y direction. The top surface 23c of the loading room 23 has an opening portion connected to the transport roller pair 53.

A reversal loading prevention cut-off portion 23j is formed on the bottom surface 23d of the loading room 23. The reversal loading prevention cut-off portion 23j prevents the instant film pack 24 from being loaded in an opposite direction by being fitted into the protrusion 24d of the instant film pack 24 (the state shown in FIG. 15).

The instant film pack 24 is positioned in the X direction and the Y direction with respect to the loading room 23, and is further positioned in the Z direction by positioning the loading lid 22 in the closed position. Specifically, the instant film pack 24 is positioned in the Z direction by causing the film holding portions 22a to 22d provided on the loading lid 22 to enter the inside of the instant film pack 24 through the opening 32a and pressing the film press plate 27 against the instant film pack.

Action of Loading Room Side Rib

As described above, in the camera 10 with a printer, the loading room side rib 23g protruding along the slit 23f and formed at a position and with a protruding amount where the loading room side rib can be inserted into the instant film pack 24 is provided in the loading room 23. Accordingly, in a case where the instant film pack 24 is loaded into the loading room 23, the loading room side rib 23g supports the instant film 28.

For example, in a case where a rotation load is large immediately after the start of rotation of the transport roller pair 53, or in a case where the operation of the claw member 57 and the operation of the transport roller pair 53 are not synchronized, the distal end side of the instant film 28 may be caught. In a case where the distal end side of the instant film 28 is caught, the base end of the instant film receives a compressive force by the claw member 57. In a case where there is no loading room side rib 23g like a printer device of the related art, since there is no part that supports an edge part of a position where the claw member passes, the instant film that receives the compressive force may buckle and wrinkle.

On the other hand, in the present embodiment, as described above, the loading room side rib 23g is provided in the loading room 23. Accordingly, as shown in FIG. 17, in a case where the instant film pack 24 is loaded into the loading room 23, the loading room side rib 23g supports the instant film 28. In FIG. 17, the film cover 30 is already sent out from the discharge port 31c and is discharged from the film discharge port 21. In FIG. 17, although the instant film 28 is not shown in order to prevent complication, in reality, the plurality of instant films 28 are stacked between the exposure aperture 31a and the film press plate 27. In FIG. 17, although the claw member drive mechanism 58 positioned at an edge part of the claw member 57 is not shown, in reality, the claw member drive mechanism 58 including a gear train or the like is provided in front of the loading room 23 is incorporated.

Since the loading room side rib 23g protrudes along the slit 23f, the claw member 57 passes a position nearest to the loading room side rib 23g. That is, in the instant film 28, since the nearest position through which the claw member 57 passes is supported by the loading room side rib 23g, buckling is unlikely to occur even though the compressive force is received from the claw member 57.

Figure 18:
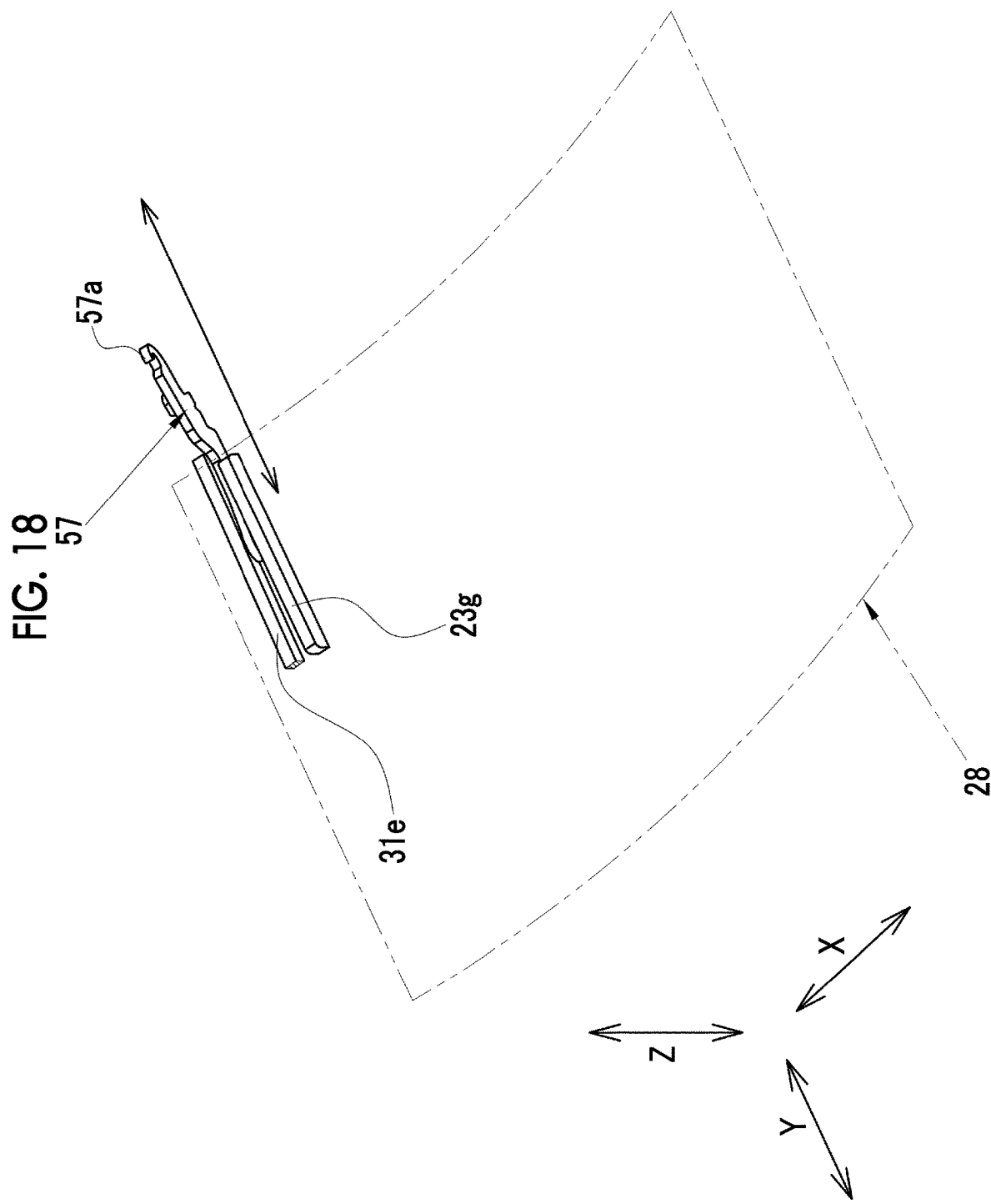
FIG. 18 is a perspective view for describing actions of the loading room side rib and the claw member.

As shown in FIG. 18, in a case where the instant film pack 24 is loaded into the loading room 23, the instant film 28 is supported by the loading room side rib 23g, and thus, the instant film is easy to be bent into a straight line in the Y direction and into a U-shaped curved surface protruding in the Z direction. Since the instant film 28 is pressed in the Z direction by the film holding portions 22a to 22d as described above, the instant film is bent so as to protrude toward the exposure aperture 31a. Since the rigidity in the Y direction and the Z direction is increased by being bent in this manner, it is possible to prevent the instant film 28 from buckling even though the instant film receives the compressive force by the claw member 57, that is, the compressive force along the Y direction.

In the present embodiment, the loading room side rib 23g is disposed at a position where the instant film 28 in the case 26 can be supported in cooperation with the film pack side rib 31e. Accordingly, in the instant film 28, the nearest position through which the claw member 57 passes is reliably supported by the loading room side rib 23g and the film pack side rib 31e. Flatness is maintained by supporting the instant film 28 with two ribs. Accordingly, the buckling by the claw member 57 is less likely to occur.

In a case where the instant film pack 24 is loaded into the loading room 23, the loading room side rib 23g has a planar surface on the distal end side facing the instant film 28, and has a square columnar shape disposed in parallel with the film pack side rib 31e. Accordingly, an area where the loading room side rib 23g and the instant film 28 come into contact with each other becomes wider. Accordingly, the instant film 28 can be supported more reliably, and the buckling by the claw member 57 is less likely to occur.

Second Embodiment

Figure 19:
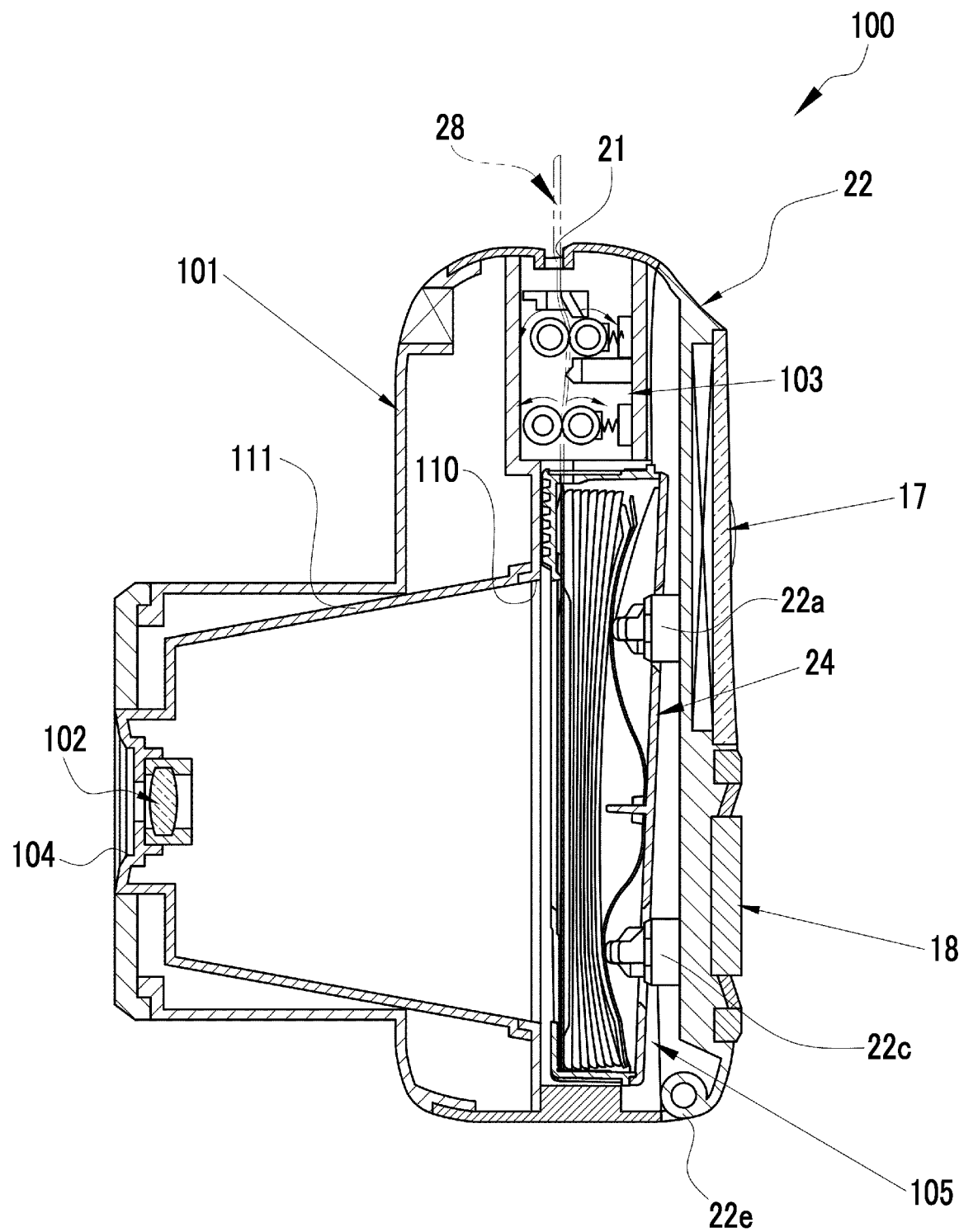
FIG. 19 is a central longitudinal cross-sectional view of a camera with a printer according to a second embodiment.

In the first embodiment, although the example applied to the digital camera with a printer is used, the present invention is not limited thereto, and may be applied to an analog camera with a printer as shown in FIG. 19. The same parts and members as those of the camera 10 with a printer of the first embodiment are designated by the same reference numerals, and the description thereof will be omitted.

A camera 100 with a printer includes a camera body 101, an imaging optical system 102, and a printer unit 103. An imaging window 104 and release switches (not shown) are provided on a front surface of the camera body 101. The imaging window 104 is disposed in a center on the front surface of the camera body 101. The imaging window 104 exposes the imaging optical system 102. A shutter device (not shown) is provided in the imaging optical system 102, and the shutter device is opened and closed in response to a pressing operation of the release switch.

Similar to the camera 10 with a printer of the first embodiment, the camera 100 with a printer uses an instant film 28. The printer unit 103 includes a loading room 105. An instant film pack 24 (recording medium pack) accommodating the instant films 28 is loaded into the loading room 105.

Similar to the loading room 23 included in the camera 10 with a printer of the first embodiment, the loading room 105 is formed in a box shape with a rear surface side opened, the loading room 105 is opened in a case where and the loading lid 22 is opened, and the loading lid 22 covers the opened rear surface of the loading room 105 in a case where the loading lid 22 is closed.

Figure 20:
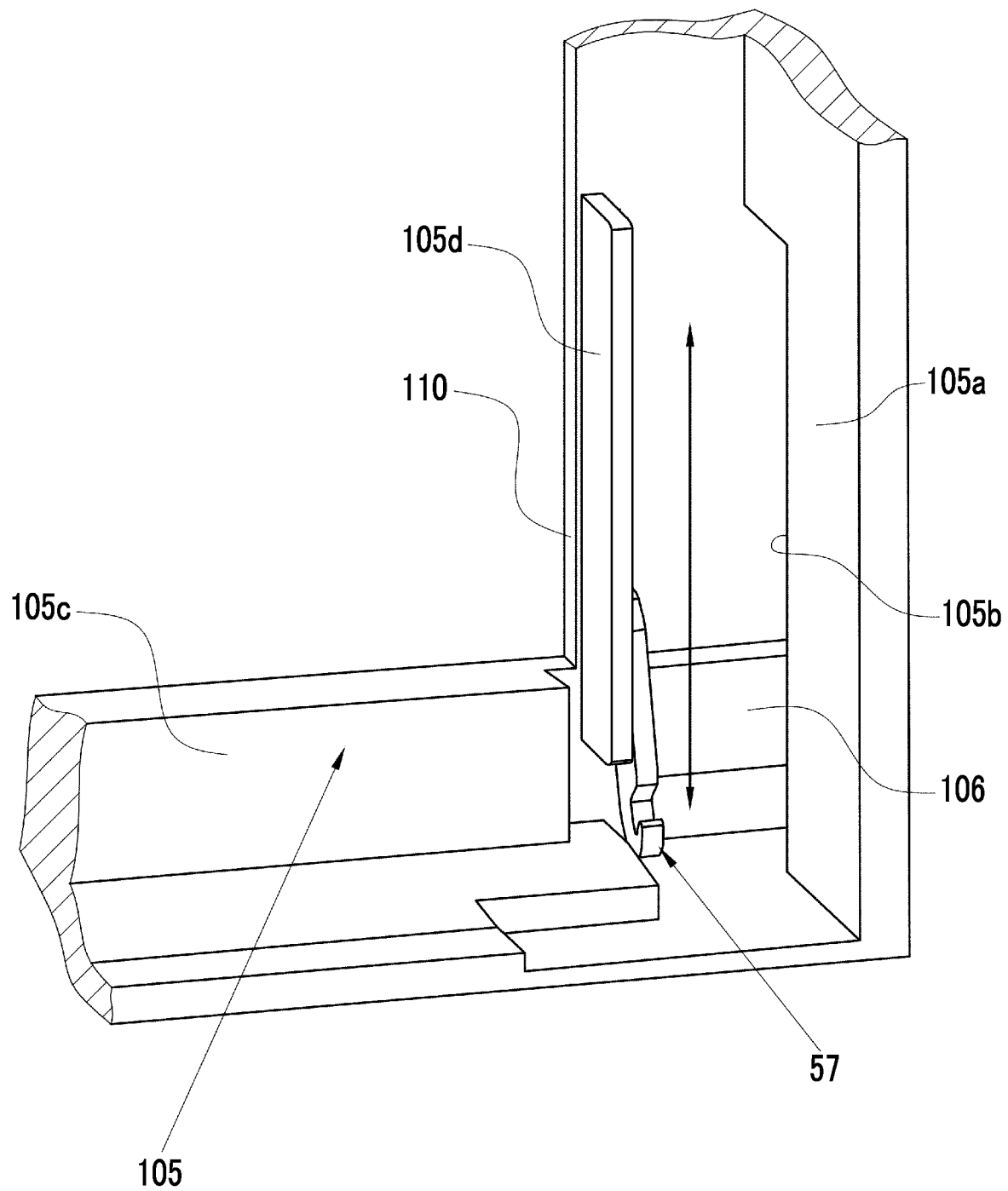
FIG. 20 is a partially enlarged perspective view of a part of a loading room and a claw member according to the second embodiment as viewed from a rear surface side.

As shown in FIG. 20, a slit 105b is provided on one side surface 105a (loading room inner surface) of the loading room 105. Although not shown, in the camera 100 with a printer, the claw member drive mechanism 58 is incorporated not in front of the loading room 105 but on a side. The claw member 57 is provided integrally with a coupling member 106. The coupling member 106 is connected to the claw member drive mechanism 58 through the slit 105b, and the driving of the claw member drive mechanism 58 is transmitted to the claw member 57.

Since the camera 100 with a printer is an analog camera, an exposure aperture 110 is provided in the loading room 105. The exposure aperture 110 is formed by cutting out a front surface 105c of the loading room 105 into a quadrangular shape. A dark box portion 111 (see FIG. 19) is provided in front of the loading room 105. The dark box portion 111 communicates with the exposure aperture 110. The imaging optical system 102 is held in front of the dark box portion 111. In a case where the shutter device is opened and closed, the imaging optical system 102 exposes the instant film 28 in the case 26 to the subject image through the exposure aperture 110.

Similar to the camera with a printer of the first embodiment, the claw member 57 is provided at a position where the claw member enters the inside of the case 26 through the slit 105b, and the instant films 28 are sent out of the instant film pack 24 one by one.

Similarly to the loading room side rib 23g of the first embodiment, a loading room side rib 105d is provided so as to protrude from the front surface 105c along the slit 105b. The loading room side rib 23g is disposed along one side of the exposure aperture 110. The loading room side rib 105d is disposed at a position inside the claw member 57.

Figure 21:
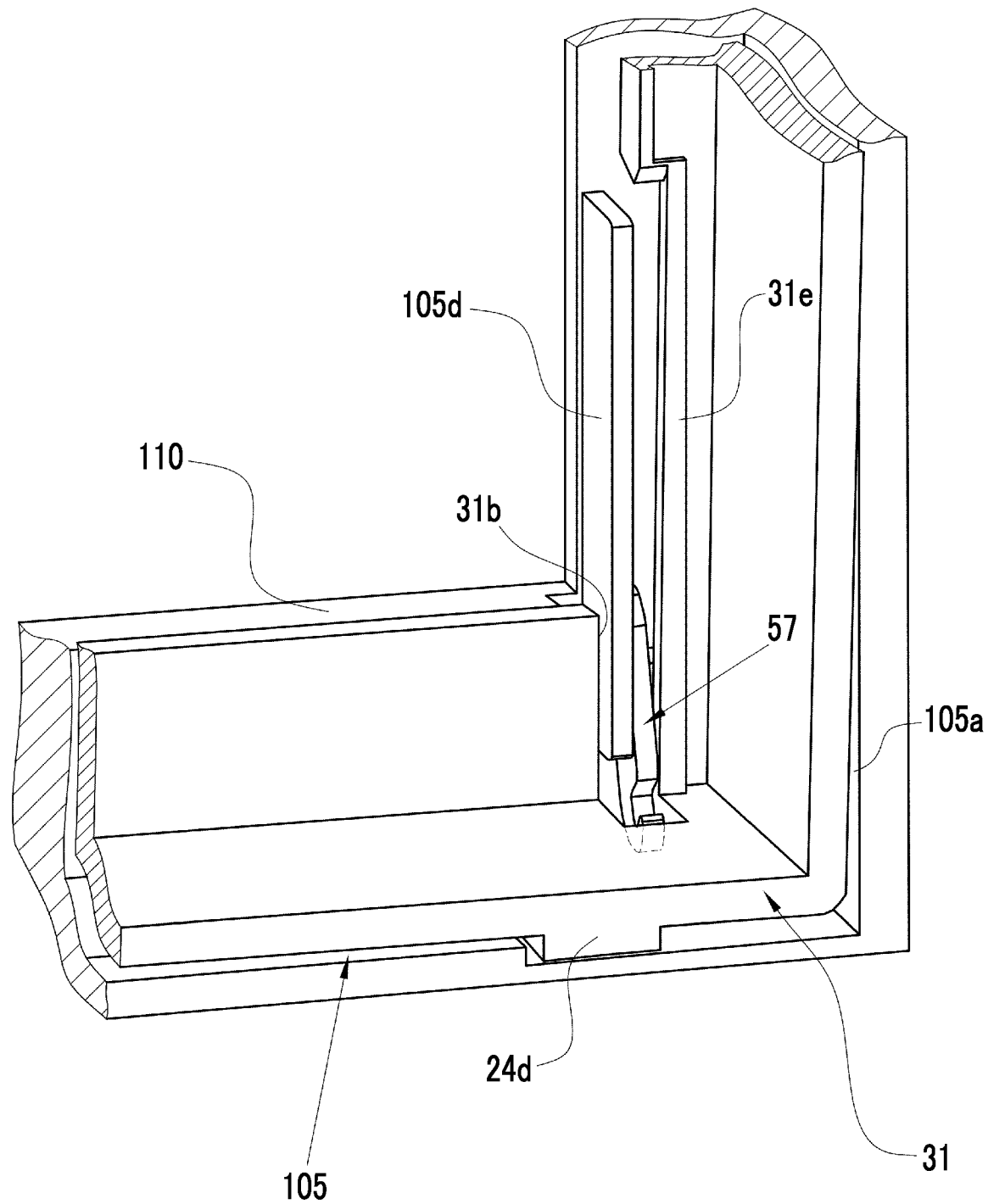
FIG. 21 is a partially enlarged perspective view of a part of the loading room, a part of a case member, and the claw member in a state where an instant film pack is loaded in the second embodiment.

As shown in FIG. 21, the loading room side rib 105d is formed at a position and with a protruding amount where the loading room side rib can be inserted into the instant film pack 24 loaded into the loading room 105. FIG. 21 shows only the case member 31 of the instant film pack 24 loaded into the loading room 105 in order to prevent complication.

Similar to the camera 10 with a printer of the first embodiment, in a case where the instant film pack 24 is loaded into the loading room 105, the loading room side rib 105d is disposed at a position where the loading room side rib enters the inside of the cut-off portion 31b of the instant film pack 24. Accordingly, the loading room side rib 105d is disposed at a position where the instant film 28 in the instant film pack 24 can be supported in cooperation with the film pack side rib 31e.

The loading room side rib 105d is disposed at a position where the claw member 57 passes between the loading room side rib and the film pack side rib 31e. That is, the claw member 57 passes between the loading room side rib 105d and the film pack side rib 31e, and sends the instant films 28 out of the instant film pack 24 one by one. In a case where the instant film pack 24 is loaded into the loading room 105, the loading room side rib 105d has a planar surface on the distal end side facing the instant film 28 and has a square columnar shape disposed in parallel with the film pack side rib 31e.

As described above, in the camera 100 with a printer, a loading room side rib 105d protruding along the slit 105b and formed at a position and with a protruding amount where the loading room side rib can be inserted into the instant film pack 24 is provided in the loading room 105. Accordingly, similarly to the camera 10 with a printer of the first embodiment, in a case where the instant film 28 is sent out, since the instant film 28 is supported by the loading room side rib 105d, buckling is unlikely to occur even though the compressive force is received from the claw member 57.

In the present embodiment, the example applied to the analog camera 100 with a printer is given, and the exposure aperture 110 is provided in the loading room 105. Accordingly, in a case where the instant film 28 is sent out, there is no part that supports a portion facing the exposure aperture 110. That is, although the portion of the instant film 28 facing the exposure aperture 110 is easy to receive a compressive force, in the present embodiment, since the loading room side rib 105*d* is provided to support the instant film 28, buckling can be prevented.

Figure 22:
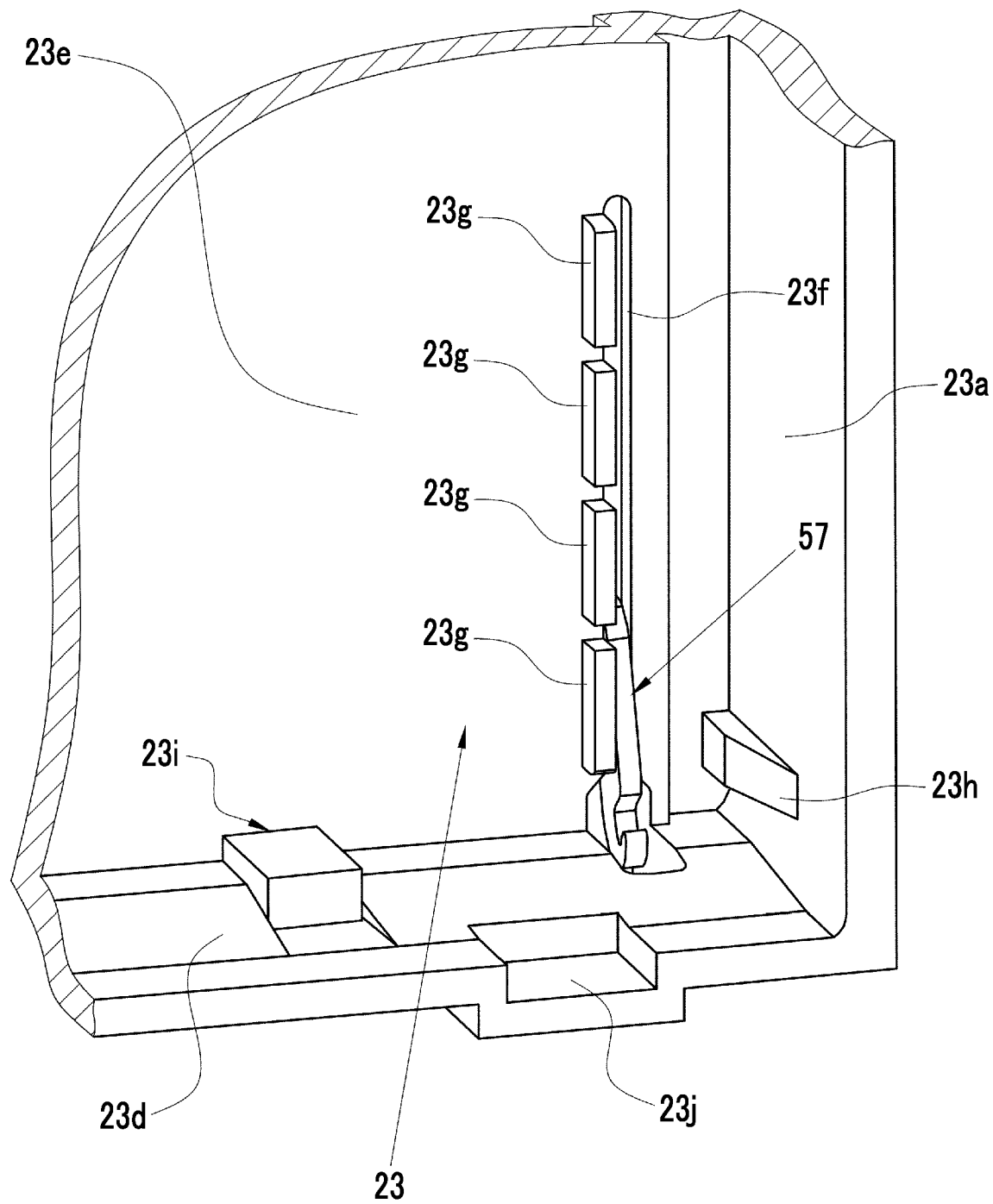
FIG. 22 is a partially enlarged perspective view of a part of a loading room, a part of a case member, and a claw member in a state where an instant film pack is loaded in a modification example.

In each of the above embodiments, although the loading room side ribs 23*g* and 105*d* are provided for the loading rooms 23 and 105, respectively, the present invention is not limited thereto. For example, as shown in FIG. 22, a plurality of intermittent loading room side ribs 23*g* and 105*d* may be arranged in a row as long as the loading room side ribs have shapes and arrangement capable of supporting the instant film 28. The shapes of the loading room side ribs 23*g* and 105*d* are not limited to the square columnar shape, and may be a triangular columnar column, a semicircular columnar shape, or the like.

In each of the above embodiments, although a monosheet type instant film is exemplified as the sheet-shaped recording medium, the present invention is not limited thereto. Any recording medium that can be accommodated in a stacking manner in a case may be used, for example, thermal paper, inkjet paper, or the like may be used. In a case where the recording medium is the thermal paper, the printer is a thermal printer, and in a case where the recording medium is the inkjet paper, the printer is an inkjet printer. In each of the above embodiments, although the example in which the present invention is applied to the camera with a printer is used, the present invention is not limited thereto, and the present invention may be applied to a single printer device.

In the above embodiment, a hardware structure of a processing unit that executes various kinds of processing such as the controller 59 includes various processors to be described below. The various processors include a central processing unit (CPU) which is a general-purpose processor that executes software (programs) and functions as various processing units, a graphical processing unit (GPU), a programmable logic device (PLD), which is a processor capable of changing a circuit configuration after manufacture, such as a field programmable gate array (FPGA), and a dedicated electric circuit, which is a processor having a circuit configuration specifically designed in order to execute various kinds of processing.

One processing unit may be constituted by one of these various processors, or may be constituted by a combination of two or more processors of the same type or different types (for example, a combination of a plurality of FPGAs, a combination of a CPU and an FPGA, a combination of a CPU and a GPU, or the like). The plurality of processing units may be constituted by one processor. As an example in which the plurality of processing units are constituted by one processor, firstly, one processor is constituted by a combination of one or more CPUs and software as represented by computers such as clients and servers, and this processor functions as the plurality of processing units. Secondly, a processor that realizes the functions of the entire system including the plurality of processing units via one Integrated Circuit (IC) chip is used as represented by a system on chip (SoC). As described above, the various processing units are constituted by using one or more of the various processors as the hardware structure.

More specifically, an electric circuitry in which circuit elements such as semiconductor elements are combined can be used as the hardware structure of these various processors.

EXPLANATION OF REFERENCES

10: camera with printer
11: camera body
12: imaging unit
13: printer unit
15: imaging window
16A, 16B: release switch
17: rear display unit
18: operating part
18*a*: menu switch
18*b*: print switch
19: imaging optical system
20: solid-state imaging element
21: film discharge port
22: loading lid
22*a* to 22*d*: film holding portion
22*e*: hinge portion
23, 105: loading room
23*a*, 23*b*: side surface
23*c*: top surface
23*d*: bottom surface
23*e*: front surface
23*f*: slit
23*g*, 105*d*: loading room side rib
23*h*: positioning protrusion
23*i*: elastic member
23*j*: reversal loading prevention cut-off portion
24: instant film pack
24*a*, 24*b*: side surface
24*c*: bottom surface
24*d*: reversal loading prevention protrusion
24*e*: top surface
26: case
27: film press plate
27*a*, 27*b*: sheet
27*c*: opening
27*d*: hole
27*e*: opening
27*f*: hole
27*g*: lower end part
27*h*: lower end part
28: instant film
28*a*: exposure surface
30: film cover
31: case member
31*a*: exposure aperture
31*b*: cut-off portion
31*c*: discharge port
31*d*: light shielding seal
31*e*: film pack side rib
32: lid
32*a*: opening
32*b*: unit support protrusion
32*c*: caulking pin
32*d*: support piece
33: mask sheet
33*a*: screen opening
34: photosensitive sheet
35: cover sheet
36: developer pod
37: trap portion
38: developer
39: gap
40: positive image observation surface
50: exposure head
51: film support member
52: roller drive mechanism
53: transport roller pair
54: spreading roller pair
55: spreading control member 56: device housing
57: claw member
57a: distal end portion
58: claw member drive mechanism
59: controller
61: capstan roller
61a: spike roller member
61b, 62b: drive gear
61c, 62c: rotary shaft
62: pinch roller
62a: roller member
62b: drive gear
62c: rotary shaft
63, 64: spreading roller
100: camera with printer
101: camera body
102: imaging optical system
103: printer unit
104: imaging window
105: loading room
105a: one side surface
105b: slit
105c: front surface
105d: loading room side rib
106: coupling member
110: exposure aperture
111: dark box portion
X, Y, Z: directions
P: exposure position

What is claimed is:

1. A printer device comprising:
a loading room into which a recording medium pack is loaded, the recording medium pack including at least sheet-shaped recording media and a case in which the recording media are accommodated in a stacking manner and a discharge port for sending out the recording medium is formed;
a slit that is formed in the loading room, and is formed by cutting out a part of a loading room inner surface facing the recording medium;
a claw member that enters an inside of the case through the slit, and sends out the recording medium from the discharge port; and
a loading room side rib that is provided to protrude from the loading room inner surface along the slit,
wherein the loading room side rib is formed at a position and with a protruding amount where the loading room side rib is capable of being inserted into the recording medium pack loaded into the loading room.

2. The printer device according to claim 1,
wherein the loading room side rib is disposed such that a position of a distal end facing the recording medium is a position capable of supporting the recording medium in the case in cooperation with a film pack side rib provided in the case.

3. The printer device according to claim 2,
wherein the loading room side rib is disposed at a position where the claw member passes between the loading room side rib and the film pack side rib.

4. The printer device according to claim 2,
wherein the case has a cut-off portion through which the claw member passes in a case where claw member sends out the recording medium,
the film pack side rib is disposed along the cut-off portion, and
the loading room side rib is disposed at a position where the loading room side rib enters an inside of the cut-off portion in a case where the recording medium pack is loaded into the loading room.

5. The printer device according to claim 2,
wherein the loading room side rib has a square columnar shape disposed in parallel with the film pack side rib in a case where the recording medium pack is loaded into the loading room.

6. The printer device according to claim 1,
wherein, in the loading room side rib, a surface on a distal end side facing the recording medium is a planar shape.

7. The printer device according to claim 1,
wherein the recording medium is a monosheet type instant film.

8. The printer device according to claim 7,
wherein the loading room has an exposure aperture that exposes the recording medium in the case to subject light, and
the loading room side rib is disposed along one side of the exposure aperture.

9. A camera with a printer comprising:
the printer device according to claim 8; and
an imaging optical system that exposes the recording medium in the case to a subject image through the exposure aperture.

10. A camera with a printer comprising:
the printer device according to claim 1; and
an imaging unit that includes an imaging optical system, and captures a subject image to output image data to the printer.

* * * * *